United States Patent
Kihara et al.

(10) Patent No.: US 8,485,591 B2
(45) Date of Patent: Jul. 16, 2013

(54) FRONT VEHICLE BODY STRUCTURE

(75) Inventors: Makoto Kihara, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 249 days.

(21) Appl. No.: 13/103,527

(22) Filed: May 9, 2011

(65) Prior Publication Data
US 2011/0272971 A1 Nov. 10, 2011

(30) Foreign Application Priority Data

May 10, 2010 (JP) .................. 2010-108611
May 10, 2010 (JP) .................. 2010-108619
May 10, 2010 (JP) .................. 2010-108627

(51) Int. Cl.
*B62D 23/00* (2006.01)

(52) U.S. Cl.
USPC ............ 296/203.02; 296/193.07; 296/193.09; 296/204

(58) Field of Classification Search
USPC .................. 296/203.01, 203.02, 203.03, 204, 296/187.09, 187.12, 193.01, 193.02, 193.09, 296/29, 30
See application file for complete search history.

(56) References Cited

U.S. PATENT DOCUMENTS

| 5,112,102 | A | * | 5/1992 | Wurl | 296/204 |
| 5,713,625 | A | * | 2/1998 | Takahashi et al. | 296/204 |
| 5,882,065 | A | | 3/1999 | Koiwa et al. | |
| 6,145,923 | A | * | 11/2000 | Masuda | 296/1.03 |
| 6,296,300 | B1 | * | 10/2001 | Sato | 296/187.08 |
| 6,299,240 | B1 | * | 10/2001 | Schroeder et al. | 296/203.01 |
| 6,460,918 | B1 | * | 10/2002 | Sato et al. | 296/204 |
| 6,908,146 | B2 | * | 6/2005 | Tomita | 296/203.02 |
| 6,981,736 | B2 | * | 1/2006 | Morsch et al. | 296/193.07 |
| 7,165,805 | B2 | * | 1/2007 | Miyata | 296/203.02 |
| 7,192,071 | B2 | * | 3/2007 | Watanabe et al. | 296/30 |
| 7,264,301 | B2 | * | 9/2007 | Yasuhara | 296/187.05 |
| 7,380,830 | B2 | * | 6/2008 | Mitsui et al. | 280/784 |
| 7,578,545 | B2 | * | 8/2009 | Fujikawa | 296/187.09 |
| 7,832,795 | B2 | * | 11/2010 | Yokoi et al. | 296/204 |
| 8,029,046 | B2 | * | 10/2011 | Yamada | 296/193.02 |
| 8,118,349 | B2 | * | 2/2012 | Kihara et al. | 296/187.09 |
| 8,276,976 | B2 | * | 10/2012 | Yasuhara et al. | 296/187.09 |
| 2005/0231005 | A1 | * | 10/2005 | Miyata | 296/203.02 |
| 2006/0232104 | A1 | * | 10/2006 | Yasuhara | 296/187.05 |
| 2008/0084092 | A1 | * | 4/2008 | Yokoi et al. | 296/203.02 |

(Continued)

FOREIGN PATENT DOCUMENTS

EP 1908668 A1 4/2008
JP 60-15061 2/1985

(Continued)

*Primary Examiner* — Glenn Dayoan
*Assistant Examiner* — Gregory Blankenship
(74) *Attorney, Agent, or Firm* — Rankin, Hill & Clark LLP

(57) ABSTRACT

A front structure of a vehicle body includes left and right front side frames, a dashboard lower panel, and left and right floor frame. The dashboard lower panel has a rear surface with a cross member provided thereon, and a lower part inclined downwardly rearwardly of the vehicle body. Front end of each of the left and right floor frames extends forwardly upwardly along the lower part of the dashboard lower panel and is joined by an adapter to a rear end of a respective one of the left and right front side frames. The adapter is joined to the cross member with the dashboard lower panel sandwiched therebetween.

9 Claims, 17 Drawing Sheets

U.S. PATENT DOCUMENTS

| | | | |
|---|---|---|---|
| 2010/0026051 A1* | 2/2010 | Tamakoshi | 296/203.02 |
| 2010/0117403 A1* | 5/2010 | Kihara et al. | 296/203.02 |
| 2011/0272971 A1* | 11/2011 | Kihara et al. | 296/203.02 |
| 2012/0153679 A1* | 6/2012 | Yasuhara et al. | 296/203.02 |

FOREIGN PATENT DOCUMENTS

| | | |
|---|---|---|
| JP | 61-275024 | 12/1986 |
| JP | 64-51526 | 3/1989 |
| JP | 02-7076 U | 1/1990 |
| JP | 04-066374 | 3/1992 |
| JP | 06-74568 U | 10/1994 |
| JP | 08-002441 | 1/1996 |
| JP | 10-287269 | 10/1998 |
| JP | 2000-289651 | 10/2000 |
| JP | 2001-301645 | 10/2001 |
| JP | 2001-301649 | 10/2001 |
| JP | 2004-217174 | 8/2004 |
| JP | 2005-170320 | 6/2005 |
| JP | 2006-290311 | 10/2006 |
| JP | 2007-112260 | 5/2007 |
| JP | 2008-062760 | 3/2008 |
| JP | 2008-137483 | 6/2008 |
| JP | 2009-234495 | 10/2009 |

* cited by examiner

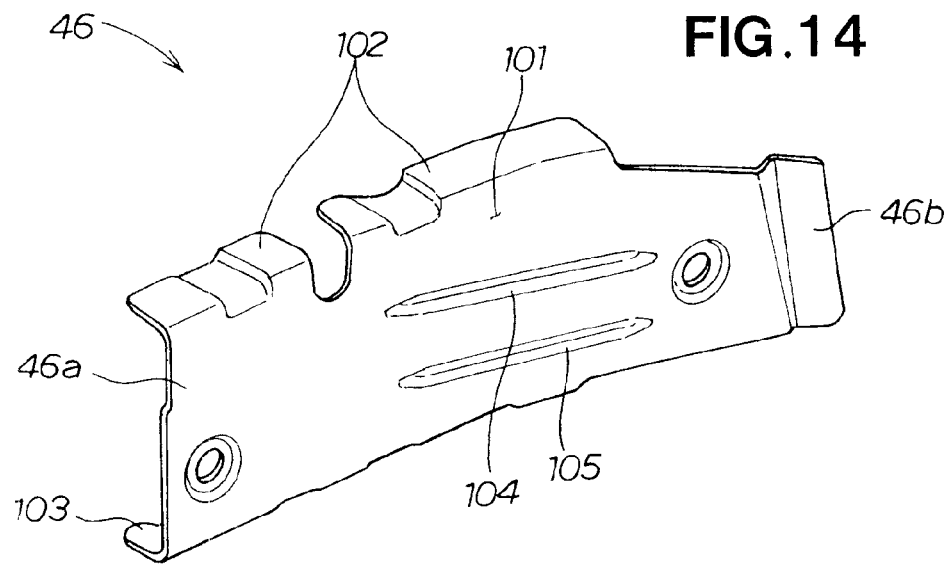
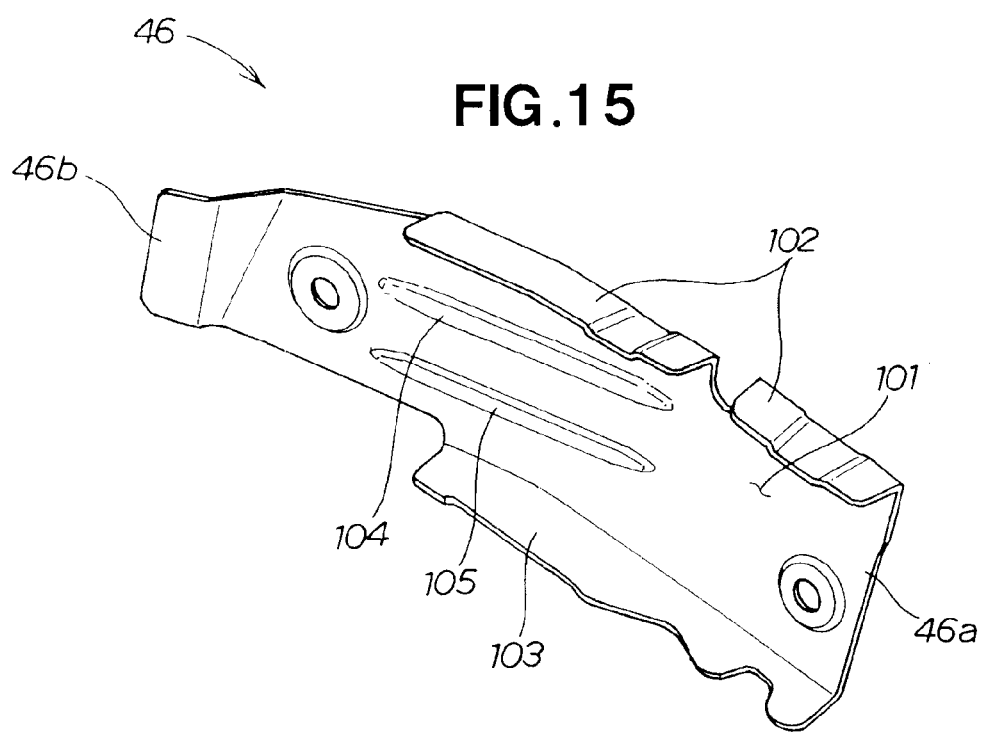

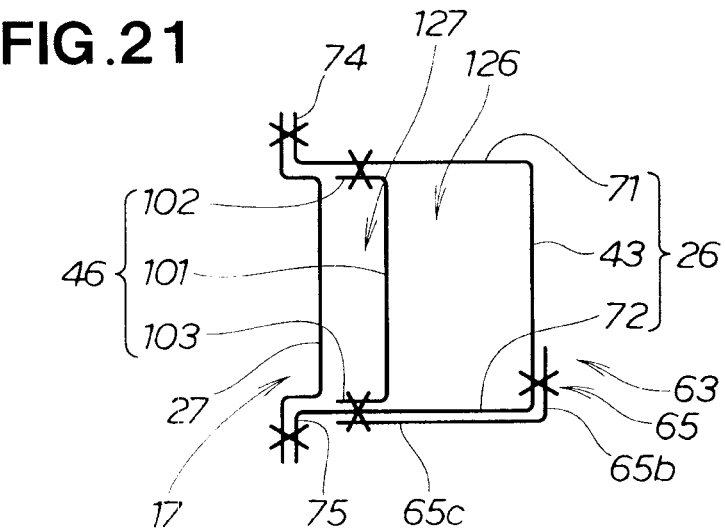
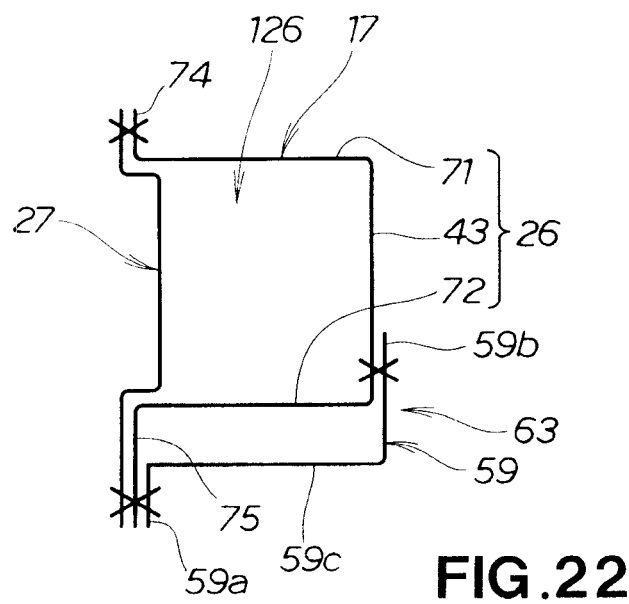

FRONT VEHICLE BODY STRUCTURE

FIELD OF THE INVENTION

The present invention relates to a front vehicle body structure having left and right front side frames provided on left and right sides of a front part of a vehicle body, and left and right floor frames extending rearward from rear ends of the left and right front side frames.

BACKGROUND OF THE INVENTION

Front part of a vehicle body is provided with left and right front side frames and left and right floor frames, which are some of vital structural elements of the vehicle body. When a so-called head-on collision occurs in which a collision force acts on the front surface of the vehicle, the collision force on the front is transferred from the left and right front side frames to the left and right floor frames and dispersed to the rear of the vehicle body. Techniques for improving the left and right front side frames are disclosed in Japanese Patent Application Laid-Open Publication No. 2006-290311 (JP-A 2006-290311) and Japanese Patent Application Laid-Open Publication No. 2009-234495 (JP-A 2009-234495).

In the vehicle body front disclosed in JP-A 2006-290311, the rear halves of the left and right front side frames curve so as to draw closer to each other as they extend rearward, increasing the strength of the curved rear halves. In the vehicle body front disclosed in JP-A-2009-234495, the sudden twisting of the left and right front side frames relative to the collision force from the front is minimized.

Recently, there has been a demand for a technique for efficiently dispersing a collision force from the front through the entire vehicle body. To accomplish this, the floor frames must be firmly joined to the front side frames.

It follows that there is a need for a technique whereby the floor frames can be firmly joined to the front side frames and a collision force acted on the front surface of the vehicle can be efficiently transferred from the front side frames rearwardly of the vehicle body.

SUMMARY OF THE INVENTION

According to the present invention, there is provided a front vehicle body structure comprising: left and right front side frames provided on left and right sides of a front part of a vehicle body and extending longitudinally of the vehicle body; a dashboard lower panel, disposed behind the left and right front side frames, for partitioning the vehicle body into front and rear parts; and left and right floor frames disposed behind the dashboard lower panel and extending longitudinally of the vehicle body, wherein each of the left and right front side frames comprises a hollow member of substantially quadrangular cross section, a cross member is provided on a rear end surface of the dashboard lower panel in such a manner as to extend transversely of the vehicle body, the dashboard lower panel has a lower part inclined rearwardly downwardly of the vehicle body, each of the left and right floor frames has a front end which extends forwardly upwardly of the vehicle body along the lower part of the dashboard lower panel and is joined via a respective one of left and a right adapters to a rear end of a respective one of the left and right front side frames, each of the left and right adapters is formed into a substantially box-shaped configuration so as to be joined to an end of a respective one of the left and right front side frames, and each of the left and right adapters is joined to the cross member with the dashboard lower panel sandwiched therebetween.

The left and right adapters are thus formed into substantially box-shaped configurations so as to be joined to an end of a respective one of the substantially quadrangular cross-sectioned left and right front side frames. Therefore, the left and right adapters can be joined extremely firmly to the rear ends of the left and right front side frames. As a result, the front ends of the left and right floor frames can be joined firmly to the rear ends of the left and right front side frames by the left and right adapters.

Furthermore, the dashboard lower panel is increased in rigidity and strength by being reinforced by the cross member provided to the rear surface. Moreover, the top parts of the left and right adapters are joined to the cross member, holding the dashboard lower panel from the sides. Therefore, when the vehicle undergoes a head-on collision, the collision force from the front of the vehicle is transferred from the front side frames to the floor frames, and is also transferred from the front side frames to the cross member via the top parts of the adapters. In other words, the collision force is efficiently transferred and dispersed throughout substantially the entire cross member and dashboard lower panel. The cross member and the dashboard lower panel are capable of sufficiently bearing the collision force. As a result, the collision force can be efficiently transferred and dispersed from the front side frames to the rear part of the vehicle body.

Preferably, each of the left and right front side frames is comprised of a front-half portion and a rear-half portion continuing from a rear end of the front-half portion, the front-half portion being formed into a linear shape elongated longitudinally of the vehicle body, the rear-half portions being curved with vehicle-widthwise inside surfaces coming closer to each other toward a rear part thereof, while each of the left and right front side frames houses therein a stiffener extending linearly longitudinally of the vehicle body, the stiffener having a front end joined to the rear end of the front-half portion and to a vehicle-widthwise inside wall and a rear end joined to a vehicle-widthwise outside wall of the respective adapter.

In a preferred form, each of the adapters is joined at a vehicle-widthwise inside wall to the inside wall of the respective one of the front side frames.

It is desirable that each stiffener be formed into a substantially U-shaped cross section opening in a vehicle width direction and has a top flange positioned at a top end and a bottom flange positioned at a bottom end, the top flange extending in the vehicle width direction and being joined to a top wall of the respective front side frame, the bottom flange extending in the vehicle width direction and being joined to a bottom wall of the respective front side frame.

It is preferred that each of the left and right adapters is comprised of a body and a reinforcing part joined to the body, the body being formed by folding a single plate material and comprised of a substantially quadrangular bottom plate faced longitudinally of the vehicle body and three side plates positioned on three sides of the bottom plate, the reinforcing part having a side plate positioned on a remaining side of the bottom plate, the side plate of the reinforcing part constituting a top part of the respective adapter and being joined to the cross member in such a manner as to sandwich the dashboard lower panel.

It is desirable that the structure further comprise left and right sub frame mount stiffeners for attaching a sub frame to lower parts of the left and right front side frames and each of the left and right sub frame mount stiffeners be provided to a lower surface of a rear part of the respective front side frame and comprised of a mount for attaching the sub frame and a reinforcing part, provided to a front part of the mount, for reinforcing the respective side frame, a front end of the reinforcing part extending up to below the front end of the stiffener housed in the respective front side frame.

It is preferred that each front side frame have a lower flange hanging down from a vehicle-widthwise outer end thereof, the mount have a substantially crank-shaped cross-sectioned and be comprised of a bottom plate running along a bottom wall of the respective front side frame, an inside flange rising from a vehicle-widthwise inner end of the bottom plate and joined to the vehicle-widthwise inside wall of the respective front side frame, and an outside flange hanging down from a vehicle-widthwise outer end of the bottom plate and joined to the lower flange of the respective front side frame, and the reinforcing part have a substantially reverse L-shaped cross section and is comprised of a bottom plate joined to the bottom wall of the respective front side frame and an inside flange rising from a vehicle-widthwise inner end of the bottom plate and joined to the vehicle-widthwise inside wall of the respective front side frame.

In a preferred form, the sub frame mount stiffener is provided to lie on the respective adapter.

It is desirable that each front side frames be comprised of a frame inner member positioned on a vehicle-widthwise inner side thereof and a frame outer member positioned on a vehicle-widthwise outer side thereof, the frame inner member have a substantially U-shaped cross section opening in the vehicle-widthwise outer side, the vehicle-widthwise-outer side open end of the frame inner member being closed off by the frame outer member, the front side frame be provided with a holding bracket for holding a collar nut for mounting an engine to be disposed between the left and right front side frames, and the front end of the stiffener be provided behind the holding bracket.

It is desirable that each of the left and right frame inner members have on a vehicle-widthwise surface a first bead, each of the left and right frame outer members have on a vehicle-widthwise surface a second bead, each of the left and right stiffeners have on a vehicle-widthwise surface a third bead, and the first bead, the second bead, and the third bead be positioned on the rear-half portion of the respective front side frame, be oriented toward the front end of the respective floor frame, and be superposed over each other in the vehicle width direction.

In a desired form, each of the left and right stiffeners have strength greater than the respective front side frame.

BRIEF DESCRIPTION OF THE DRAWINGS

Certain preferred embodiments of the present invention will be described in detail below, by way of example only, with reference to the accompanying drawings, in which:

FIG. 14 is a perspective view showing a stiffener of FIG. 6;

FIG. 15 is a perspective view illustrating the stiffener of FIG. 14, as seen from a transversely outer side of the vehicle body;

FIG. 21 is a cross-sectional view taken along line 21-21 of FIG. 20; and

FIG. 22 is a cross-sectional view taken along line 22-22 of FIG. 20.

DETAILED DESCRIPTION OF THE PREFERRED EMBODIMENTS

Figure 1:
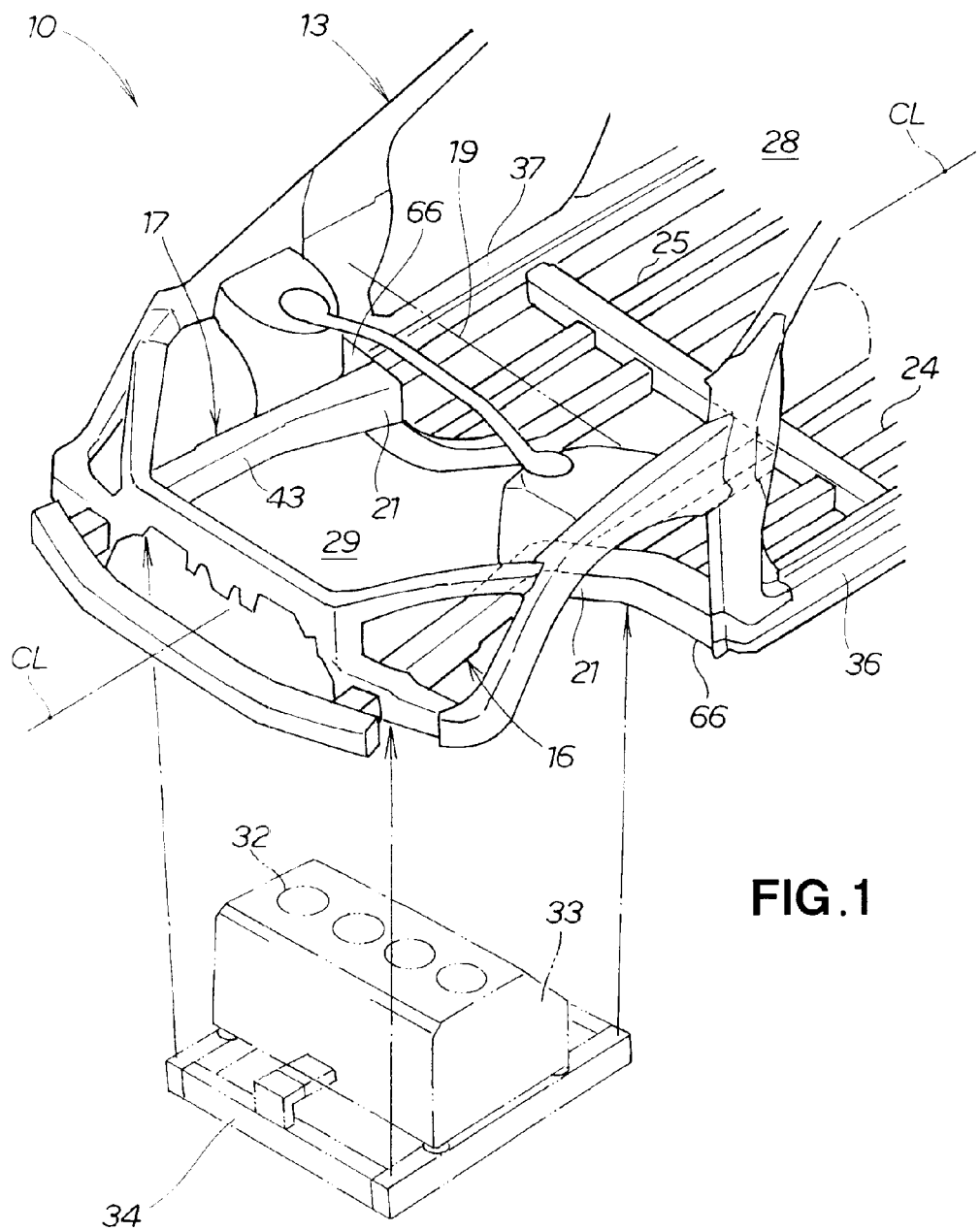
FIG. 1 is a perspective view illustrating a front part of a vehicle body, according to the present invention.
Figure 2:
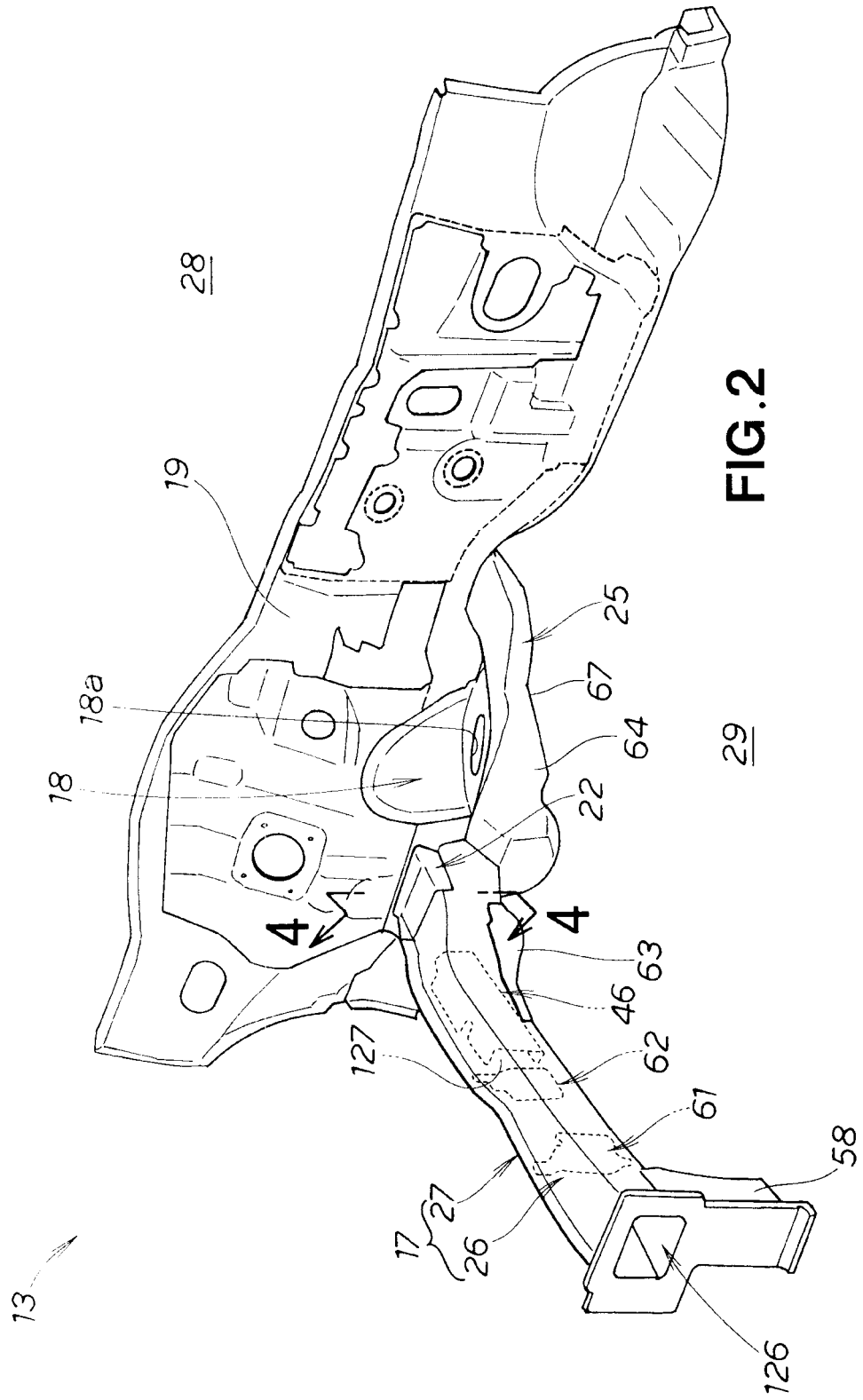
FIG. 2 is a perspective view illustrating a dashboard lower panel, a right front side frame, and a right floor frame of FIG. 1, as seen from an engine space.
Figure 3:
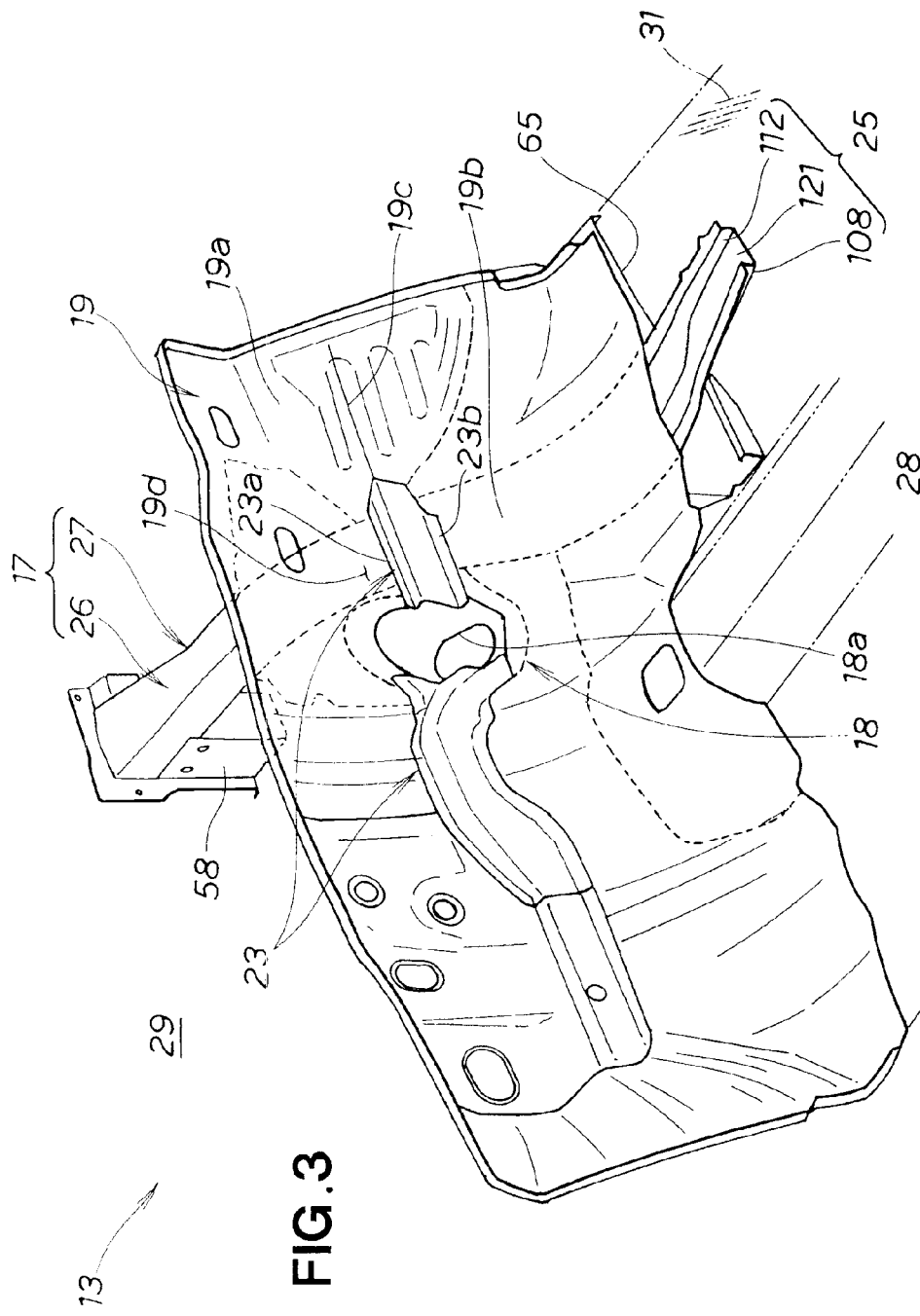
FIG. 3 is a perspective view illustrating the dashboard lower panel, the right front side frame, and the right floor frame of FIG. 2, as seen from a passenger compartment.

As shown in FIGS. 1 through 3, a vehicle 10 is a passenger vehicle, for example, and formed inside a vehicle body 13 are a front-part engine space 29 and a passenger compartment 28 positioned directly behind the engine space 29. The vehicle body 13 is composed of a monocoque body and is formed symmetrically to the left and right about a vehicle width center line CL extending in the forward-backward direction of the vehicle through the widthwise center of the vehicle 10. The front part of the vehicle body 13 includes left and right front side frames 16, 17, a dashboard lower panel 19, and left and right floor frames 24, 25.

As shown in FIGS. 1 through 4, the dashboard lower panel 19 is a wall which is positioned behind the left and right front side frames 16, 17 and which partitions the vehicle body 13 into a front and a rear, or in other words which separates the front-part engine space 29 from the rear passenger compartment 28. The dashboard lower panel 19 is composed of an upper-half-part vertical plate 19a and a lower-half-part inclined plate 19b. The vertical plate 19a is formed into a substantially vertical plate shape. The inclined plate 19b is inclined downward and to the rear from the bottom end of the vertical plate 19a.

Furthermore, the dashboard lower panel 19 has a joint cover 18 in an area where a steering shaft (not shown) is inserted, as shown in FIGS. 2 and 3. The joint cover 18 has an opening 18a for inserting the steering shaft, and the joint cover 18 is laid over and joined to the surface of the dashboard lower panel 19 that faces the engine space 29.

Figure 4:
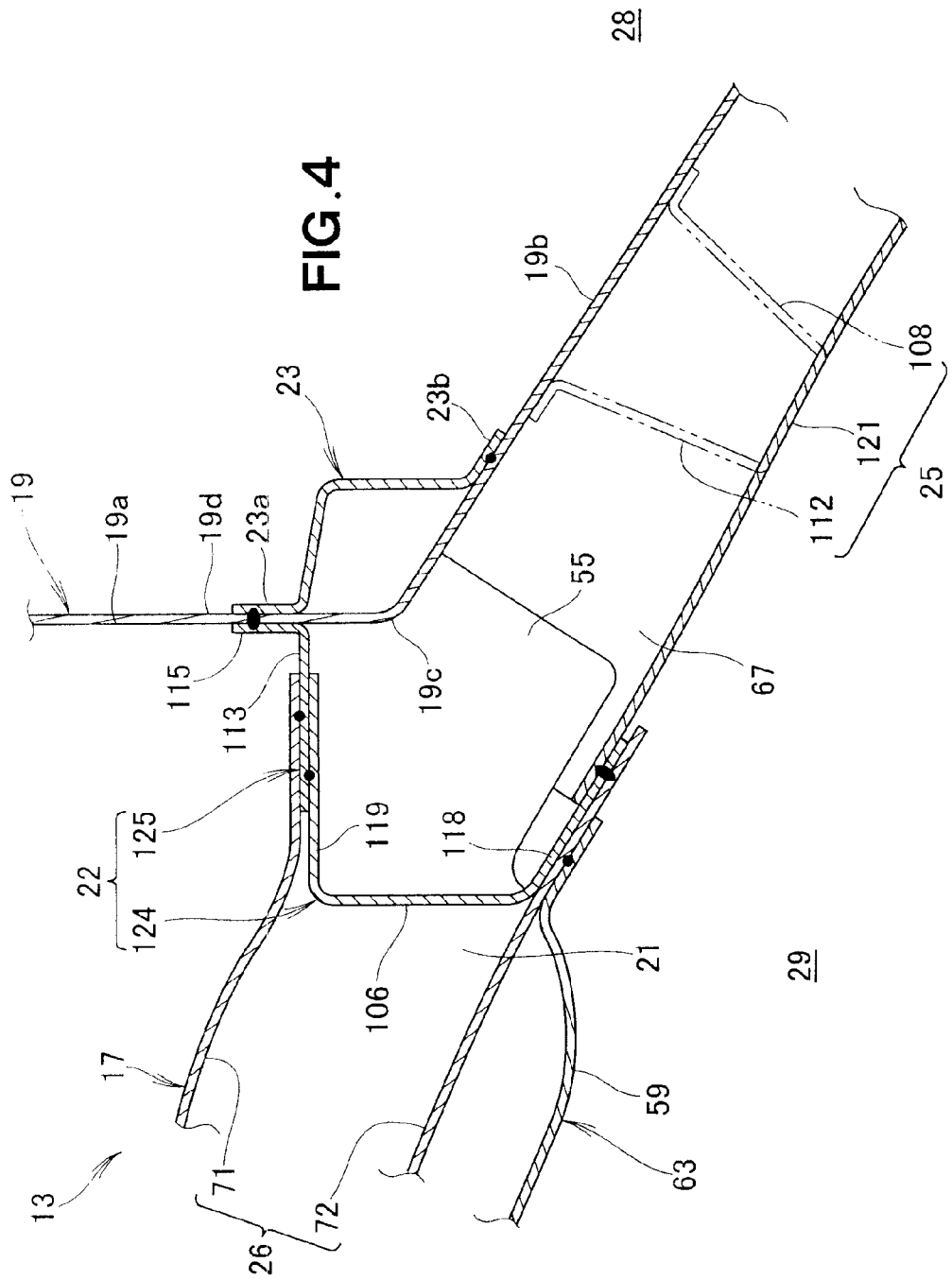
FIG. 4 is a cross-sectional view taken along line 4-4 of FIG. 2.

Furthermore, the dashboard lower panel 19 is reinforced by a cross member 23 superposed on the surface 19d (the rear surface 19d) facing into the passenger compartment 28, as shown in FIGS. 3 and 4. The cross member 23 is a long, thin member which is positioned in a corner 19c between the vertical plate 19a and the inclined plate 19b and which runs in the vehicle width direction, and this member has a substantial L shape in cross section as seen from the vehicle width direction. The cross member 23 has a top flange 23a extending upward from the top end, and a bottom flange 23b extending rearward and downward from the bottom end. The top flange 23a is superposed on and joined to the vertical plate 19a from the passenger compartment 28. The bottom flange 23b is superposed on and joined to the inclined plate 19b from the passenger compartment 28.

The cross member 23 configured in this manner is divided in two in the vehicle width direction at the portion positioned in the joint cover 18, as shown in FIGS. 2 and 3. However, the cross member 23 is integrated left to right by the joint cover 18, the dashboard lower panel 19, and the cross member 23 being joined together. The cross member 23 can also be configured from a single component having the same configuration as the component divided in two as described above.

As shown in FIGS. 1 through 3, the left and right front side frames 16, 17 are positioned on the left and right sides of the front part of the vehicle body 13 (the portion farther forward than the dashboard lower panel 19), and the frames extend in the forward-backward direction of the vehicle body 13.

The left and right floor frames 24, 25 are members which extend rearward from the rear ends 21, 21 (the frame rear ends 21, 21) of the left and right front side frames 16, 17 to be positioned in the passenger compartment 28, and which support a floor panel 31 (see FIG. 3). To be more specific, front ends 67 of the left and right floor frames 24, 25, i.e. left and right floor frame front parts 67 are joined by left and right adapters 22 to the rear ends 21, 21 of the left and right front side frames 16, 17. The left and right floor frame front parts 67 extend rearward and downward from the front ends along the lower surface of the inclined plate 19b of the dashboard lower panel 19.

Figure 7:
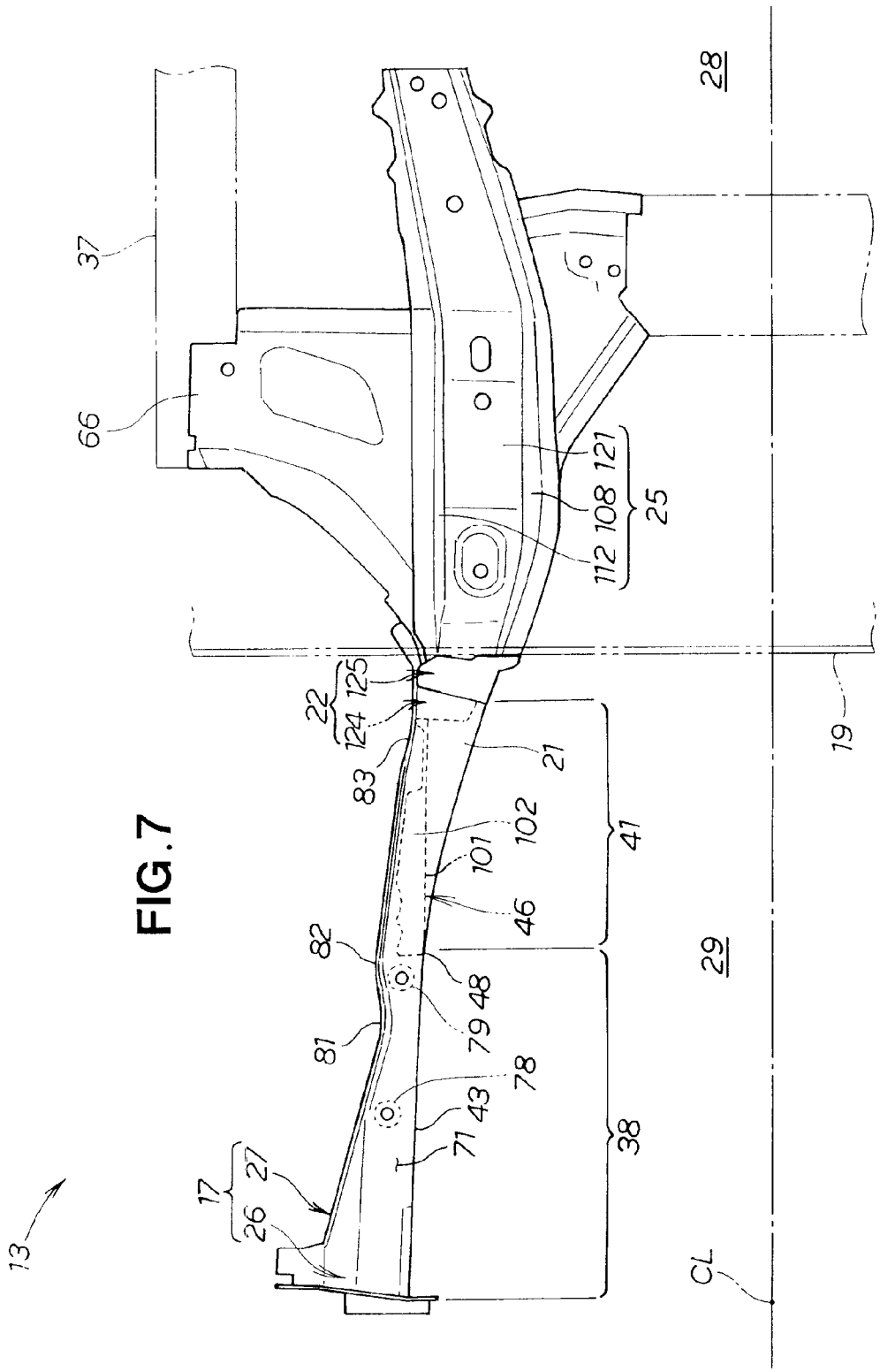
FIG. 7 is a top plan view illustrating the right front side frame and the right floor frame of FIG. 2.

As shown in FIGS. 3, 4, and 7, the right floor frame 25 is configured from a member having a substantially U-shaped cross section which opens at the top. The left floor frame 24 has the same configuration. To be more specific, the right floor frame 25 is a component formed by folding a steel plate or another plate member, and is composed of a substantially flat bottom plate 121 (a lower part 121), an inner plate 108 (an inner vertical part 108) standing upright from the inside end of the bottom plate 121 in the vehicle width direction, and an outer plate 112 (an outer vertical part 112) standing upright from the outer end of the bottom plate 121 in the vehicle width direction.

Furthermore, the left and right floor frames 24, 25 comprise left and right sub frame rear mounts 64 (see FIG. 6) and left and right outriggers 66, 66. The sub frame rear mounts 64 are members for mounting the rear end of a sub frame 34 (see FIG. 1). The left and right outriggers 66, 66 extend from the left and right floor frames 24, 25 outward in the vehicle width direction to left and right side sills 36, 37.

The left and right front side frames 16, 17, the left and right adapters 22, and the left and right floor frames 24, 25 are formed in left-to-right symmetry about the vehicle width center line CL. The right front side frame 17 is described in detail hereinbelow. The left front side frame 16 is not described because it has the same configuration as the right front side frame 17. The same applies to the left and right adapters 22 and the left and right floor frames 24, 25.

Figure 10:
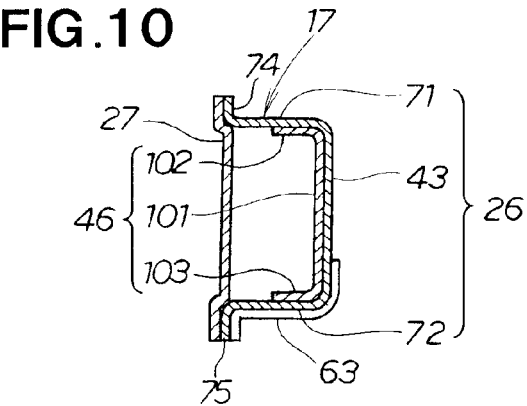
FIG. 10 is a cross-sectional view taken along line 10-10 of FIG. 5.
Figure 11:
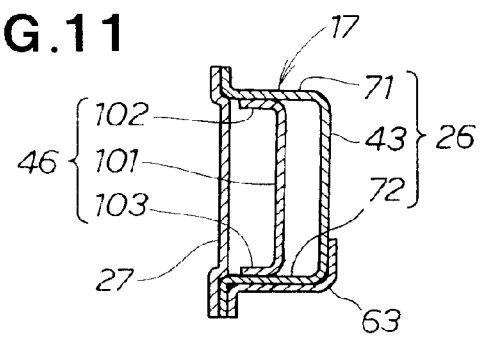
FIG. 11 is a cross-sectional view taken along line 11-11 of FIG. 5.

As shown in FIGS. 7 and 10, the right front side frame 17 is a so-called hollow member formed into a closed cross section having a substantially quadrangular shape (e.g. a rectangular cross section). In other words, the front side frame 17 has a closed cross-section structure which is rectangular in cross section, composed of a frame inner member 26 (body 26) positioned on the inner side in the vehicle width direction and a frame outer member 27 (lid member 27) positioned on the outer side in the vehicle width direction.

Figure 5:
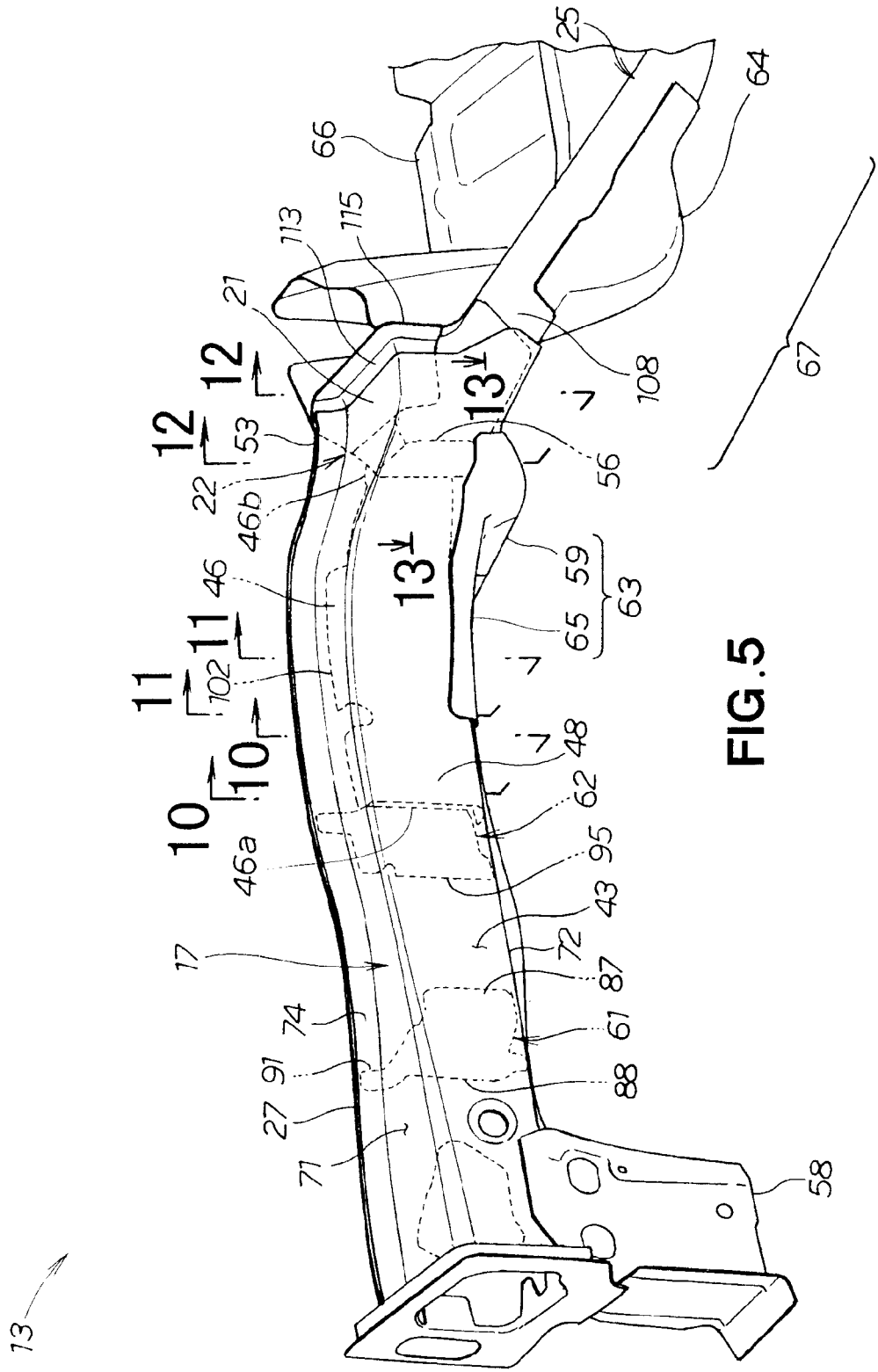
FIG. 5 is a perspective view of the right front side frame and the right floor frame of FIG. 2, as seen from the engine space.

The frame inner member 26 is configured from a member substantially U-shaped in cross section whose outer side in the vehicle width direction is open as shown in FIGS. 5 and 10. To be more specific, the frame inner member 26 is a component formed by folding a steel plate or another plate member, and is composed of a substantially perpendicular vertical plate 43 (inside wall 43, wall 43 on the vehicle-widthwise inner side) positioned toward the inside in the vehicle width direction, a top plate 71 (top wall 71) extending outward in the vehicle width direction from the top end of the vertical plate 43, and a bottom plate 72 (bottom wall 72) extending outward in the vehicle width direction from the bottom end of the vertical plate 43.

The top plate 71 has a flange 74 extending upward from the outer end in the vehicle width direction. The bottom plate 72 has a flange 75 extending downward from the outer end in the vehicle width direction. With these flanges 74, 75, the overall cross-sectional shape of the frame inner member 26 is a substantially hat-shaped cross section. The frame outer member 27 is a vertical plate-shaped member positioned so as to face towards the frame inner member 26. The top and bottom flanges 74, 75 are joined to the frame outer member 27, whereby the frame inner member 26 is joined to the frame outer member 27.

The overall general shape of the right front side frame 17 is as follows. When the vehicle body 13 is viewed from above as seen in FIG. 7, the front-half portion 38 (front frame part 38) of the front side frame 17 is formed to be substantially linear in the forward-backward direction of the vehicle. The rear-half portion 41 (rear frame part 41) of the front side frame 17 extends rearward from the rear end of the front-half portion 38 while curving toward the vehicle-widthwise center and to the rear of the vehicle.

Furthermore, when the vehicle body 13 is viewed from above as seen in FIG. 7, the outer surface in the vehicle width direction of the right front side frame 17 is formed into a substantial wave shape in the forward-backward direction of the vehicle. To be more specific, formed continuously from the front end to the rear end of the frame outer member 27 are, in order from the front, a first indented fold 81, a distended fold 82, and a second indented fold 83.

The first indented fold 81 is an indented region which is recessed inward in the vehicle width direction, and is positioned slightly forward from the center positioned halfway along the full length of the front side frame 17. The frame outer member 27 inclines toward the first indented fold 81 from the front end.

The distended fold 82 is a distended region which protrudes outward in the vehicle width direction from the first indented fold 81, and is positioned near the border between the front-half portion 38 and the rear-half portion 41 of the front side frame 17. The frame outer member 27 inclines toward the distended fold 82 from the first indented fold 81.

The second indented fold 83 is an indented region which is recessed inward in the vehicle width direction, and is positioned near the rear end of the front side frame 17. The frame outer member 27 inclines toward the second indented fold 83 from the distended fold 82.

The end surface of the frame inner member 26 on the outer side in the vehicle width direction is formed into a substantial wave shape in the forward-backward direction of the vehicle to align with the frame outer member 27. The size of the front side frame 17 in the vehicle width direction is designed so that the front end is the largest, the region of the first indented fold 81 is the smallest, and the region of the distended fold 82 is larger than the region of the first indented fold 81. Therefore, the cross-sectional area of the front side frame 17 is largest in the front end, gradually decreasing from the front end to the first indented fold 81; and smallest in the region of the first indented fold 81, gradually increasing from the first indented fold 81 to the distended fold 82; wherein the region of the distended fold 82 is greater than the region of the first indented fold 81.

Figure 6:
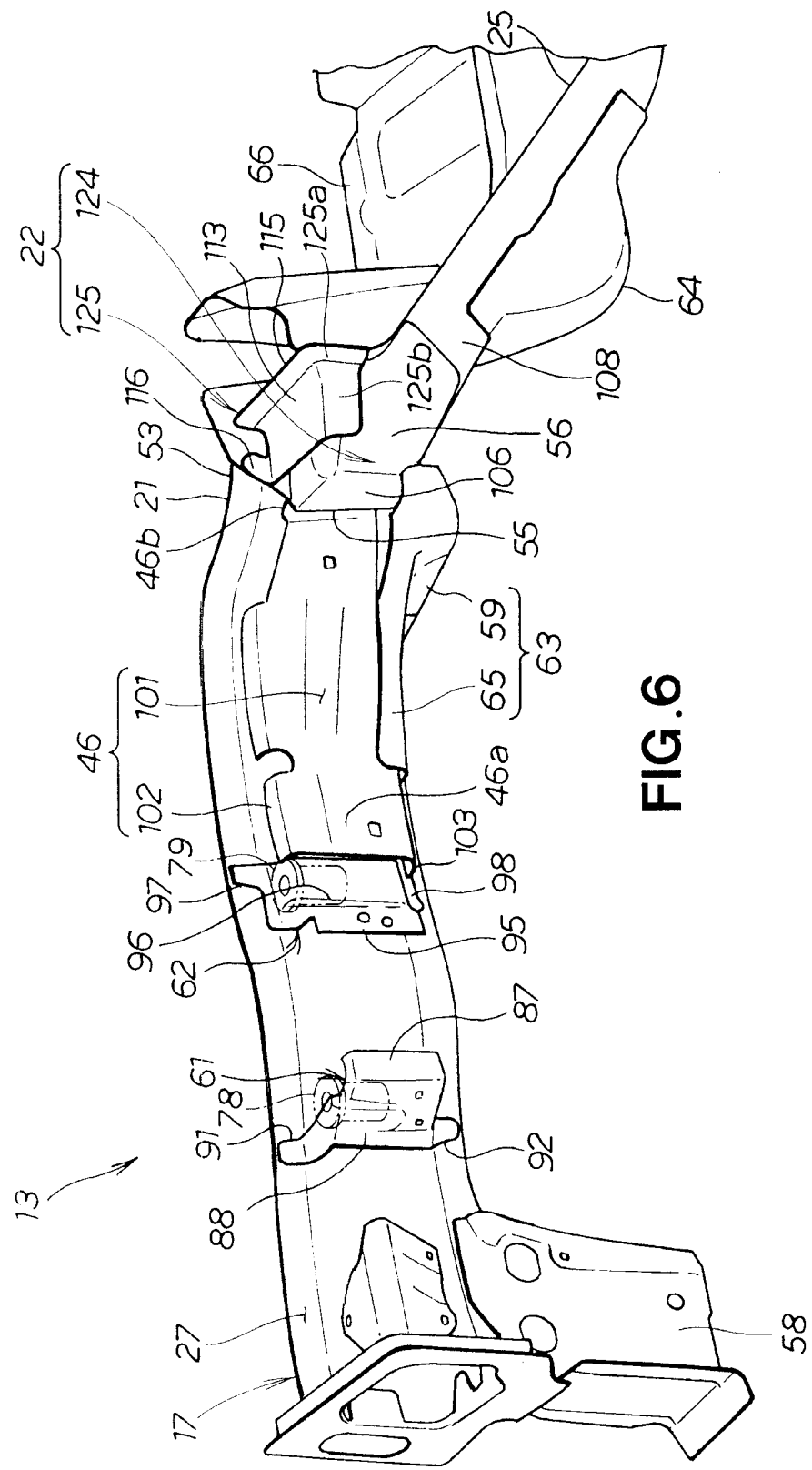
FIG. 6 is a perspective view illustrating the configuration of FIG. 2, with a frame inner member removed from the right front side frame of FIG. 2, as seen from the passenger compartment.

As shown in FIGS. 5 through 7, a stiffener 46 greater in strength than the front side frame 17 is provided inside the rear frame part 41 of the right front side frame 17. Therefore, it is possible to improve the characteristic of transmitting collision force from the front which acts in the longitudinal direction of the front side frame 17. For example, the material of the stiffener 46 is configured from a material having greater tensile strength (high-tensile steel or the like) than the front side frame 17. For example, the practical cross-sectional area of the stiffener 46 which relates to tensile strength is designed to be greater than the practical cross-sectional area of the front side frame 17.

As described above, the front frame part 38 of the front side frame 17 extends in a substantially linear manner in the forward-backward direction of the vehicle. The stiffener 46 is a long, thin member extending in the forward-backward direction so as to substantially coincide with the length of the vertical plate 43 (the inside wall 43) of the front frame part 38, and the stiffener extends in a substantially linear manner in the forward-backward direction of the vehicle, as shown in FIG. 7.

As shown in FIGS. 10, 14, and 15, the stiffener 46 is configured from a member having a substantially U-shaped cross section which opens outward in the vehicle width direction. To be more specific, the stiffener 46 is a component formed by folding a steel plate or another plate member, and is composed of a substantially perpendicular vertical plate-shaped stiffener body 101, a top flange 102 extending outward in the vehicle width direction from the top end of the stiffener body 101, and a bottom flange 103 extending outward in the vehicle width direction from the bottom end of the stiffener body 101.

The stiffener body 101 is positioned so as to be held between the top plate 71 and the bottom plate 72 of the frame inner member 26, and is extended in a substantially linear manner in the forward-backward direction of the vehicle so as to substantially coincide with the length of the vertical plate 43 of the front frame part 38 (see FIG. 7). The top flange 102 is joined to the inside surface of the top plate 71 of the frame inner member 26. The bottom flange 103 is joined to the inside surface of the bottom plate 72 of the frame inner member 26. The top and bottom flanges 102, 103 are joined to the top plate 71 and the bottom plate 72, thereby integrating the stiffener 46 with the frame inner member 26.

As shown in FIGS. 7 and 10, a front end 46a of the stiffener 46, i.e. the front end of the stiffener body 101 is positioned at the rear end 48 of the front frame part 38 and is joined to the inside surface of the vertical plate 43. A rear end 46b of the stiffener 46 is joined to a rear end 53 of the frame outer member 27 as show in FIGS. 5 through 7, 12, and 13.

Thus, the middle of the rear frame part 41 of the front side frame 17 which is formed into a closed cross section is partitioned in the vehicle width direction by the stiffener 46. In other words, the front side frame 17 is formed into a rectangular closed cross section 126 as shown in FIG. 2, and another closed cross section 127 (see FIGS. 2 and 21) is also formed by the frame outer member 27 and the stiffener 46.

Beads are formed in the front side frame 17 and the stiffener 46 as shown in FIGS. 14 through 18. This is described in detail hereinbelow.

Figure 16:
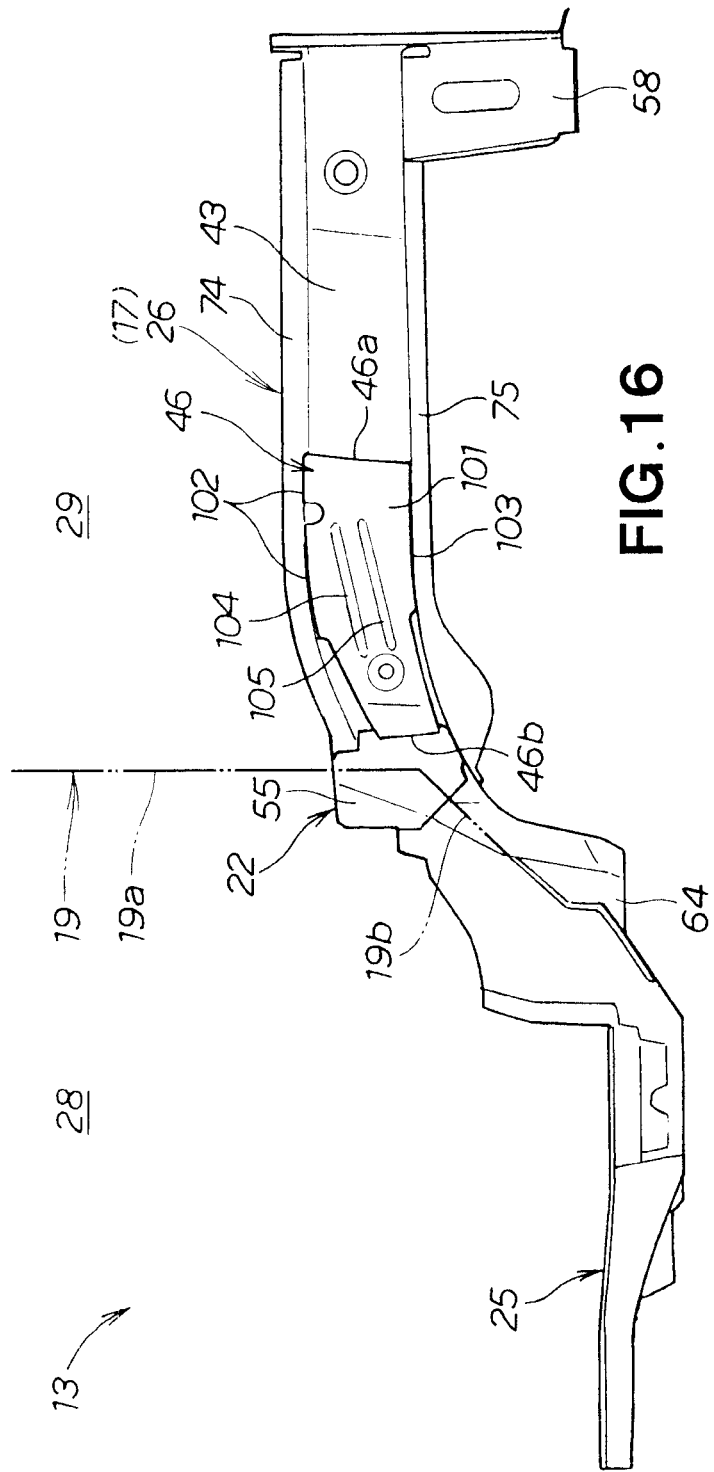
FIG. 16 is a side elevational view showing the configuration of FIG. 5, with the frame outer member removed from the right front side frame, as seen from the transversely outer side of the vehicle body.

As shown in FIGS. 14 through 16, third beads 104, 105 are formed on the vehicle-widthwise surface of the stiffener body 101 of the stiffener 46. As seen from the side of the vehicle body 13, the third beads 104, 105 are positioned so as to overlap the vertical plate 43 of the frame inner member 26 and the frame outer member 27, and these beads, which are long and thin in the forward-backward direction of the vehicle, are inclined so as to be oriented toward the front end 67 of the floor frame 25.

Figure 17:
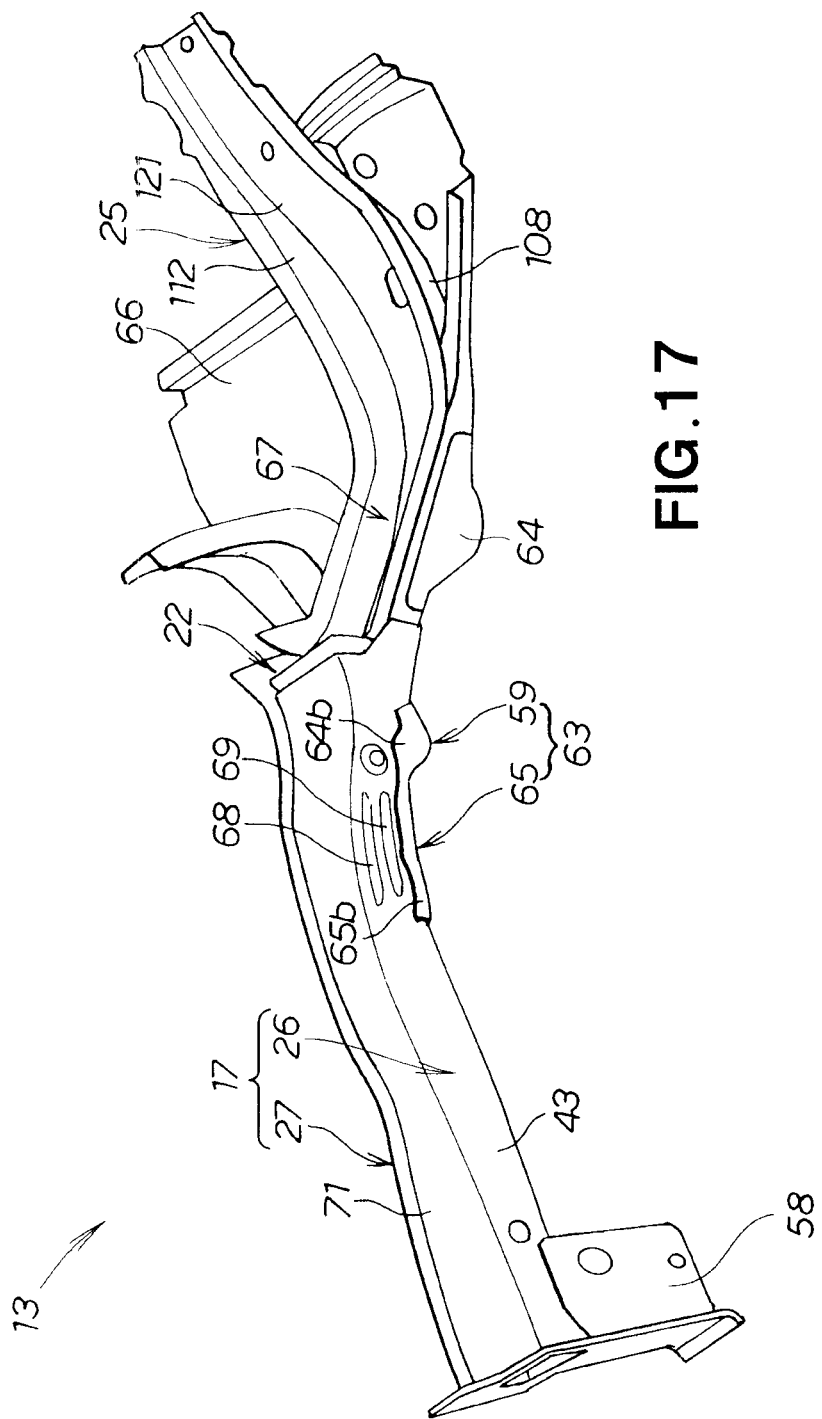
FIG. 17 is a perspective view of the configuration of FIG. 5, with beads provided on the frame inner member of the right front side frame.

As shown in FIG. 17, first beads 68, 69 are formed on the vertical plate 43 of the frame inner member 26, on the vehicle-widthwise surface of the rear frame part 41 of the front side frame 17. As seen from the side of the vehicle body 13, the first beads 68, 69 are positioned so as to overlap the frame outer member 27 and the stiffener 46, and these beads, which are long and thin in the forward-backward direction of the vehicle, are inclined so as to be oriented toward the front end 67 of the floor frame 25.

Figure 18:
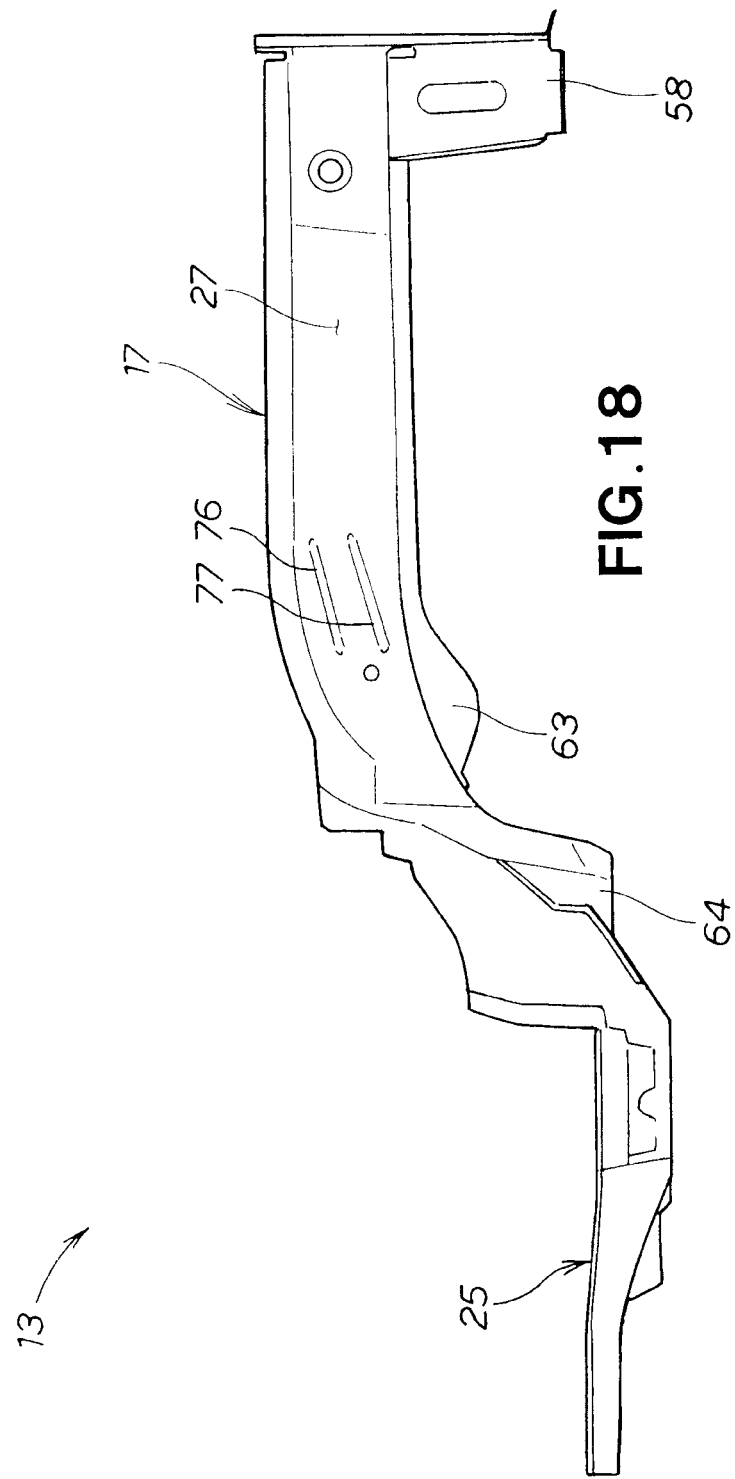
FIG. 18 is a side elevational view showing the configuration of FIG. 17, with the beads provided on the frame outer member of the right front side frame, as seen from the transversely outer side of the vehicle body.

As shown in FIG. 18, second beads 76, 77 are formed on the vehicle-widthwise surface of the frame outer member 27 of the front side frame 17. As seen from the side of the vehicle body 13, the second beads 76, 77 are positioned so as to overlap the vertical plate 43 of the frame inner member 26, the frame outer member 27, and the stiffener 46, and these beads, which are long and thin in the forward-backward direction of the vehicle, are inclined so as to be oriented toward the front end 67 of the floor frame 25.

Thus, the first beads 68, 69, the second beads 76, 77, and the third beads 104, 105 are positioned in the rear half portion 41 of the front side frame 17 and are provided to the front side frame 17 and the stiffener 46. Moreover, the first beads 68, 69, the second beads 76, 77, and the third beads 104, 105 are all oriented towards the front end 67 of the floor frame 25 and are superposed over each other in the vehicle width direction. The rigidity and strength of the front side frame 17 are accordingly improved; therefore, when a collision load acts on the vehicle body 13 from the front of the vehicle, the collision load can be transferred smoothly from the front side frame 17 to the floor frame 25.

Figure 8:
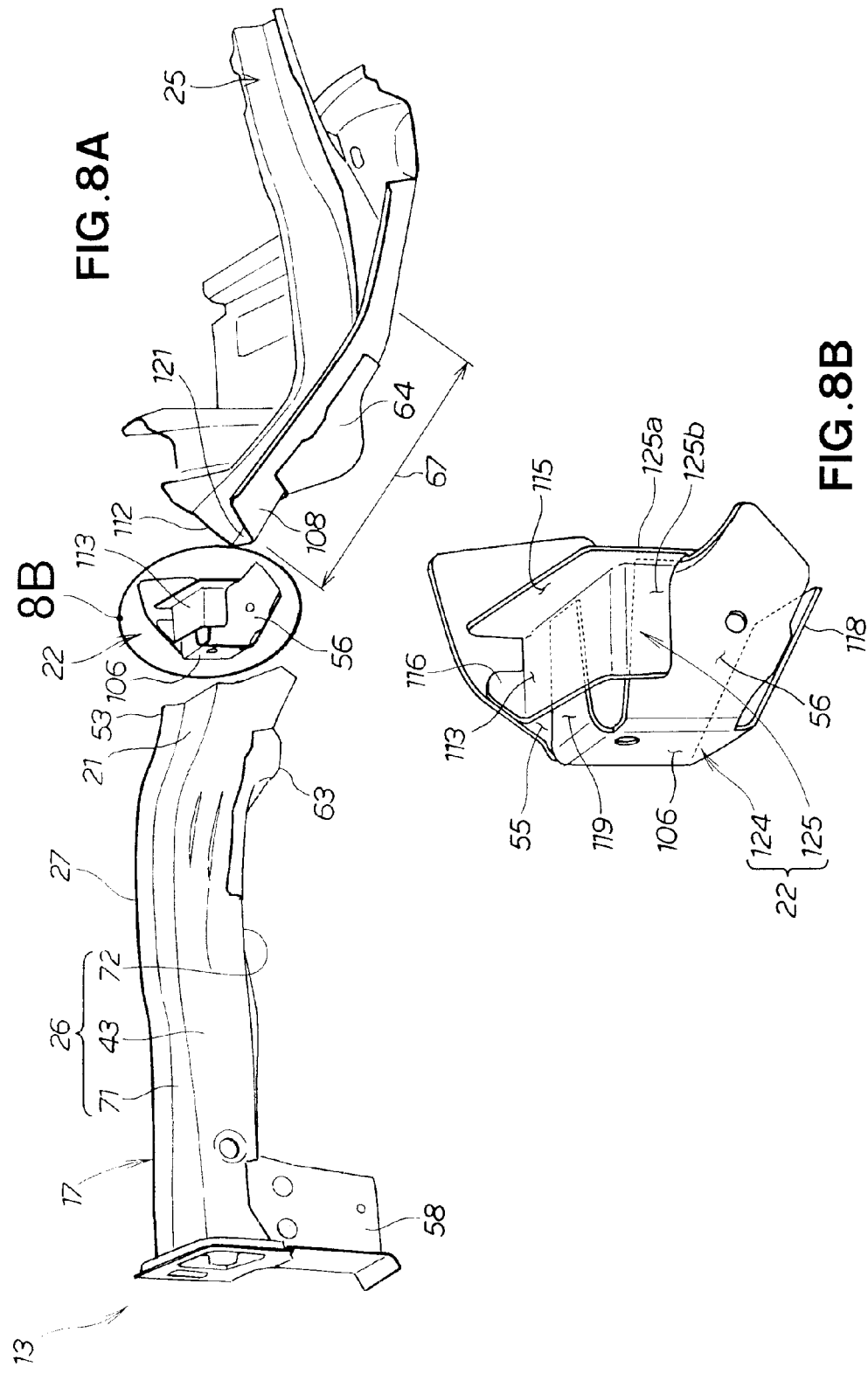
FIGS. 8A and 8B are views illustrating details of an adapter for joining together the right front side frame and the right floor frame of FIG. 5.

Next, the right adapter 22 will be described in detail. FIG. 8A is an exploded view of the right front side frame 17, the right floor frame 25, and the right adapter 22 shown in FIG. 5. FIG. 8B is an enlarged view of the right adapter 22 (section 8B) shown in FIG. 8A.

As shown in FIGS. 4, 8A, 8B, 12, and 13, the right adapter 22 is joined to the vertical plate 43, the top plate 71, and the bottom plate 72 of the frame inner member 26 and to the four sides of the frame outer member 27, and is also joined via the dashboard lower panel 19 to the cross member 23. The adapter 22 is a substantially quadrangular box-shaped member composed of a body 124 and a reinforcing part 125 joined to the body 124.

The body 124 is fitted into and joined to the frame rear end 21 of the front side frame 17. The front end 67 of the floor frame 25 (the floor frame front part 67) is fitted into and joined to the body 124.

To be more specific, the body 124 is a component formed by folding a steel plate or the like, and is composed of a substantially quadrangular partitioning plate 106 (a bottom plate 106) which partitions the interior of the front side frame 17 lengthwise, and four side plates 55, 56, 118, 119 each extending toward the rear of the vehicle from the four sides of the partitioning plate 106. The rear end of the body 124 is open. The four side plates 55, 56, 118, 119 are separated from each other. The rear ends of the four side plates 55, 56, 118, 119 are free ends.

In other words, the outer plate 55 (the outside part 55, the wall 55 on the vehicle-widthwise outer side) is composed of a vertical plate extending toward the rear of the vehicle from the vehicle-widthwise outer side of the partitioning plate 106. The inner plate 56 (the inside part 56, the wall 56 on the vehicle-widthwise inner side) is composed of a vertical plate extending toward the rear of the vehicle from the vehicle-widthwise inner side of the partitioning plate 106. The bottom plate 118 (the bottom wall 118) is composed of a horizontal plate extending toward the rear of the vehicle from the bottom side of the partitioning plate 106. The top plate 119 (the top wall 119) is composed of a horizontal plate extending toward the rear of the vehicle from the top side of the partitioning plate 106. The outer plate 55 extends higher upward than the top surface of the top plate 119.

The reinforcing part 125 is a component formed by folding a steel plate or another plate member, and is superposed on and integrated with the top of the body 124. The reinforcing part 125 is formed into a substantial crank shape as seen from the plate surface of the partitioning plate 106, and is composed of a substantially horizontal ceiling plate 113 (a connecting ceiling part 113), a welding flange 116 standing upright from one end of the ceiling plate 113, a welding flange 125b hanging down from the other end of the ceiling plate 113, a reinforcing rib 125a extending inward in the vehicle width direction from the rear end of the welding flange 125b, and a reinforcing rib 115 (a flange 115) standing upright from the rear end of the ceiling plate 113.

The ceiling plate 113 is laid over and joined to the top surface of the top plate 119. The welding flange 116 is laid over and joined to the inner surface of the outer plate 55. The welding flange 125b is laid over and joined to the outer surface of the inner plate 56. The reinforcing rib 125a continues into the reinforcing rib 115.

As shown in FIGS. 8A, 8B, 12, and 13, the surface on the vehicle-widthwise outer side of the outer plate 55 is laid over and joined to the rear end 46b of the stiffener body 101, and is also laid over and joined to the inner surface of the frame outer member 27 of the front side frame 17. The outer surface of the outer plate 55, i.e. the surface on the vehicle-widthwise inner side is laid over and joined to the outer surface of the outer plate 112 of the floor frame 25. The outer surface of the inner plate 56 is laid over and joined via the welding flange 125b to the inner surface of the vertical plate 43 of the front side frame 17. In other words, the inner plate 56 is in effect joined to the vertical plate 43. The inner surface of the inner plate 56 is laid over and joined to the outer surface of the inner plate 108 of the floor frame 25. The outer surface of the bottom plate 118 is laid over and joined to the top surface of the bottom plate 72 of the front side frame 17. The inner surface of the bottom plate 118 is laid over and joined to the lower surface of the bottom plate 121 of the floor frame 25.

As shown in FIGS. 4, 8A, 8B, and 12, the reinforcing rib 115 and the reinforcing rib 125a are joined to the top flange 23a of the cross member 23, holding the dashboard lower panel 19 from the sides.

The sub frame 34 is attached from below to the left and right front side frames 16, 17, as shown in FIG. 1. An engine 32 and a transmission 33 are arranged transversely in the vehicle width direction and are mounted in the sub frame 34. The left and right front side frames 16, 17 curve as shown in FIG. 7 so that the engine 32 and the transmission 33 can be arranged transversely in the vehicle width direction. To be more specific, the right front side frame 17 comprises a front mount 58, a first bracket 61, a second bracket 62, and a sub frame mount stiffener 63, as shown in FIG. 2. The front mount 58 is a member for mounting the front end of the sub frame 34 shown in FIG. 1, and this mount hangs down from the front end of the front side frame 17. The first and second brackets 61, 62 are members for mounting the engine 32 or the transmission 33 shown in FIG. 1. The sub frame mount stiffener 63 is a member for mounting the rear part of the sub frame 34.

The first bracket 61 is provided inside and in the longitudinal substantial center of the front frame part 38 of the front side frame 17, as shown in FIGS. 6 and 7. The first bracket 61 is composed of a first inner bonding part 87 for bonding to the inner surface of the vertical plate 43 of the frame inner member 26, a first partitioning part 88 continuing from the first inner bonding part 87, a collar nut 78 provided to the first partitioning part 88, a first top bonding piece 91 extending upward from the top end of the first partitioning part 88, and a first bottom bonding piece 92 extending downward from the bottom end of the first partitioning part 88.

The first partitioning part 88 is formed into a substantial quadrangular shape which partitions the inside of the front side frame 17 lengthwise. The collar nut 78 is a member for attaching a mount (not shown). The first top bonding piece 91 is held and joined between the frame outer member 27 and the flange 74 shown in FIG. 10. The first bottom bonding piece 92 is held and joined between the frame outer member 27 and the flange 75 shown in FIG. 10.

The second bracket 62 is provided inside and in proximity to the rear end of the front frame part 38, as shown in FIGS. 6 and 7. The second bracket 62 is composed of a second inner bonding part 95 for bonding to the inner surface of the vertical plate 43 of the frame inner member 26, a second partitioning part 96 continuing from the second inner bonding part 95, a collar nut 79 provided to the second partitioning part 96, a second top bonding piece 97 extending upward from the top end of the second partitioning part 96, and a second bottom bonding piece 98 extending downward from the bottom end of the second partitioning part 96.

Figure 9:
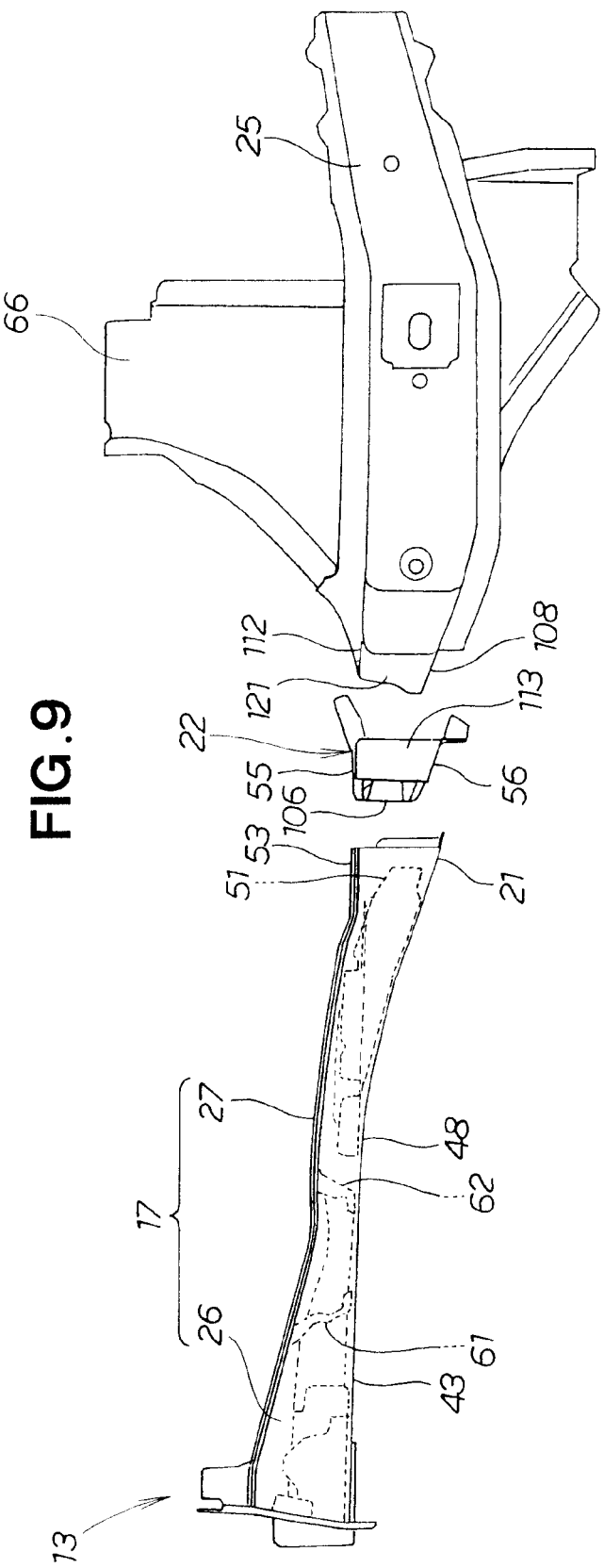
FIG. 9 is an exploded view illustrating the right front side frame, the right floor frame, and the right adapter of FIG. 7.

The second partitioning part 96 is formed into a substantial quadrangular shape which partitions the inside of the front side frame 17 lengthwise. The collar nut 79 is a member for attaching a mount (not shown). The second top bonding piece 97 is held and joined between the frame outer member 27 and the flange 74 shown in FIG. 9. The second bottom bonding piece 98 is held and joined between the frame outer member 27 and the flange 75 shown in FIG. 10.

Figure 19:
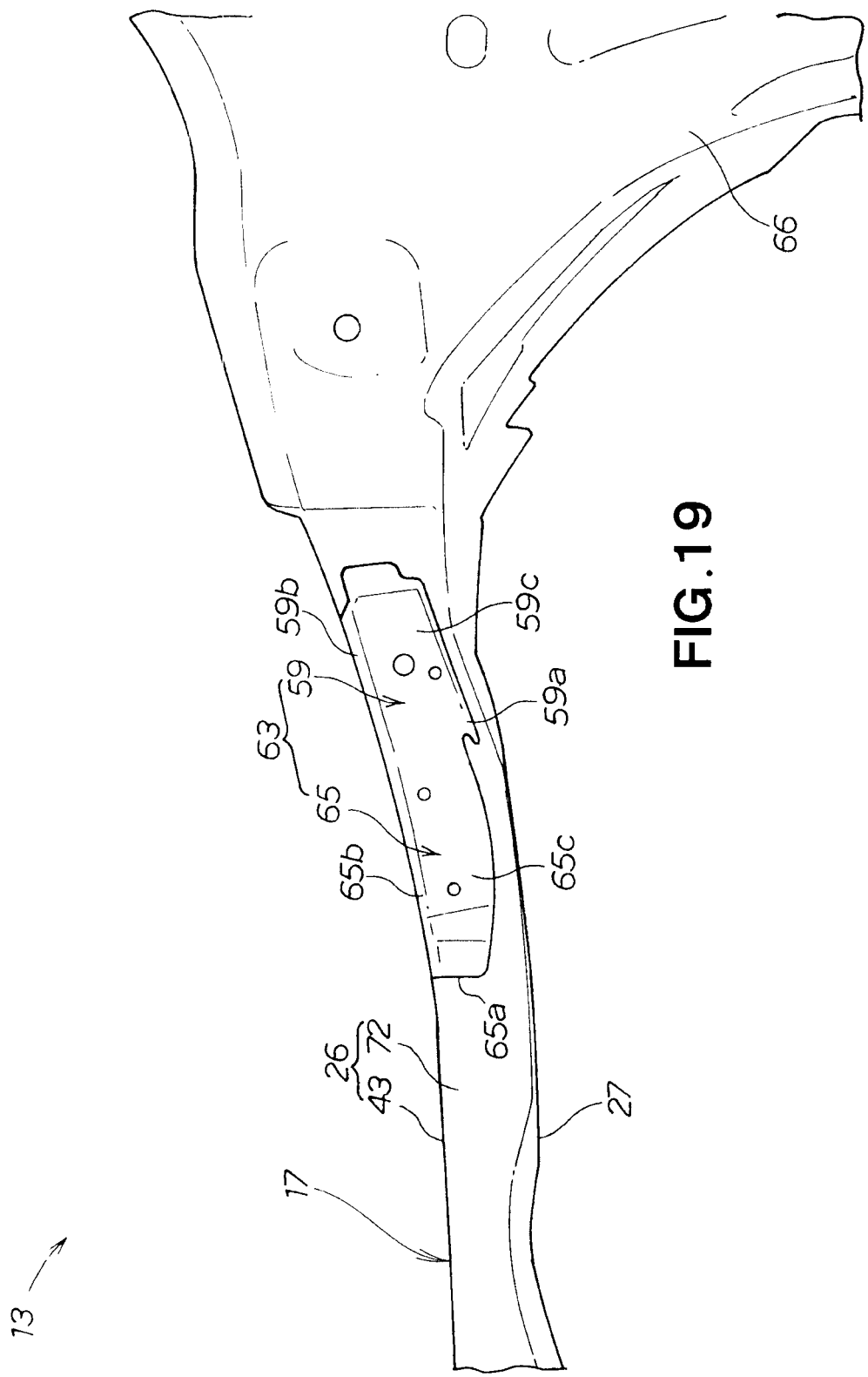
FIG. 19 is a bottom view illustrating on an enlarged scale an primary part of the right front side frame of FIG. 5.
Figure 20:
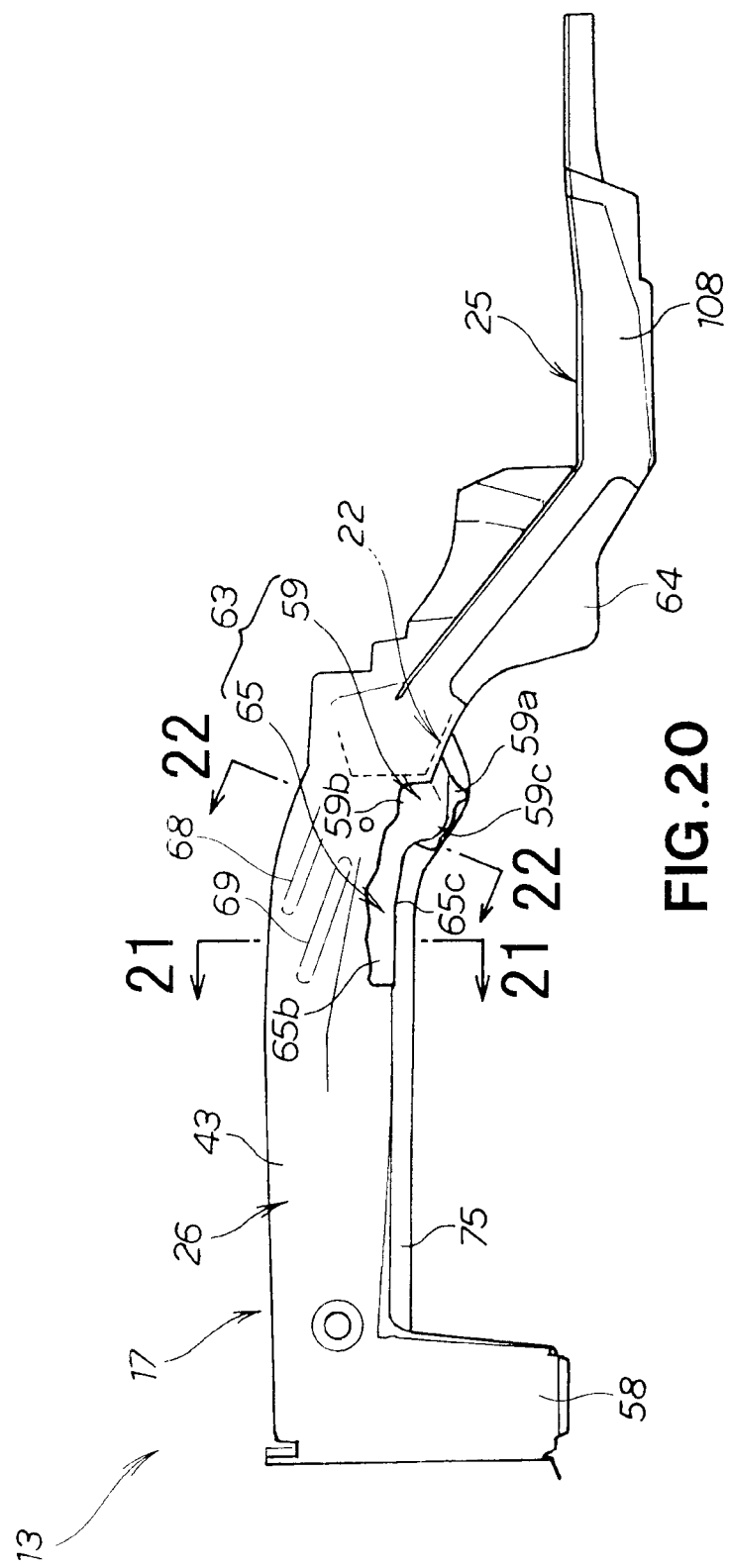
FIG. 20 is a view illustrating the right front side frame and the right floor frame of FIG. 17, as seen from a transversely inner side of the vehicle body.

As shown in FIGS. 19 and 20, the sub frame mount stiffener 63 is provided to the bottom of the rear frame part 41 of the front side frame 17 and is composed of a mount 59 and a reinforcing part 65. Furthermore, the sub frame mount stiffener 63 is positioned so as to overlap the adapter 22.

The mount 59 is a portion for attaching the sub frame 34 and is positioned in the rear part of the sub frame mount stiffener 63, and the mount bulges downward from the lower surface of the rear frame part 41. As shown in FIGS. 20 and 22, the mount 59 is formed into a substantially crank-form shape as seen from the front of the vehicle, and is composed of a bottom 59c substantially running along the bottom plate 72 of the frame inner member 26, an outside flange 59a extending downward from the vehicle-widthwise outer end of the bottom 59c, and an inside flange 59b extending upward from the vehicle-widthwise inner end of the bottom 59c.

The reinforcing part 65 is a portion for reinforcing the front side frame 17, and is positioned in the front part of the sub frame mount stiffener 63. A front end 65a of the reinforcing part 65 extends below the front end 46a of the stiffener 46 from the mount 59. As shown in FIGS. 20 and 21, the reinforcing part 65 is formed into a substantially L-form shape as seen from the front of the vehicle, and is composed of a bottom 65c substantially running along the bottom plate 72 of the frame inner member 26, and an inside flange 65b extending upward from the vehicle-widthwise inner end of the bottom 65c.

The following is a summary of the above description. As shown in FIGS. 4, 8A, 8B, and 12, the right adapter 22 is formed into a substantially box-form shape so as to be joined to the surfaces 27, 43, 71, 72 of the right front side frame 17 which has a substantially quadrangular cross section. Therefore, the adapter 22 can be joined extremely firmly to the rear end 21 of the front side frame 17. As a result, the front end 67 of the right floor frame 25 can be firmly joined to the rear end 21 of the right front side frame 17 by the right adapter 22.

Furthermore, the dashboard lower panel 19 is reinforced by the cross member 23 provided to the rear surface 19d as shown in FIG. 4, thereby improving rigidity and strength. Moreover, the top part of the right adapter 22 is joined to the cross member 23, holding the dashboard lower panel 19 from the sides. Therefore, when the vehicle 10 undergoes a head-on collision, the collision force from the front of the vehicle 10 is transferred from the front side frame 17 to the floor frame 25, and is transferred from the front side frame 17 to the cross member 23 via the top part of the adapter 22. In other words, the collision force from the front is transferred and dispersed efficiently throughout substantially the entire cross member 23 and dashboard lower panel 19. The cross member 23 and the dashboard lower panel 19 can sufficiently bear the collision force. As a result, the collision force can be efficiently transferred and dispersed to the rear part of the vehicle body 13 from the front side frame 17.

Furthermore, the front side frame 17 is composed of the front-half portion 38 and the rear-half portion 41 which continues from the rear end of the front-half portion 38, as shown in FIG. 7. The front-half portion 38 is formed into a long, thin, linear shape extending in the forward-backward direction of the vehicle body 13. The rear-half portion 41 curves while its vehicle-widthwise inside surfaces draw closer to each other as it extends rearward from the front end.

A front side frame 17 of such description can be configured from two members: the frame inner member 26, which has a substantially U-shaped cross section opening in the vehicle width direction, and the frame outer member 27, as shown in FIG. 10. Therefore, the front side frame 17 can be manufactured straightforwardly and with high precision, and is readily assembled. Moreover, molding costs can be reduced because the shape of the metal mold for folding (pressing) the front side frame 17 from a plate member can be simplified.

Furthermore, the stiffener 46, which is formed to be linear in the forward-backward direction of the vehicle body 13, is housed within the front side frame 17 as shown in FIGS. 6 and 7. The front end 46a of the stiffener 46 is joined to the rear end of the front-half portion 38 and to the vehicle-widthwise inside wall (the vertical plate 43). The rear end 46b of the stiffener 46 is joined to the vehicle-widthwise outside wall 55 of the adapter 22. Therefore, when the collision force from the front acts on the front side frame 17, the collision force can be transferred linearly in the forward-backward direction from the front-half portion 38 to the adapter 22 via the stiffener 46. As a result, the collision force from the front can be transferred efficiently from the front side frame 17 to the rear of the vehicle body 13.

Figure 12:
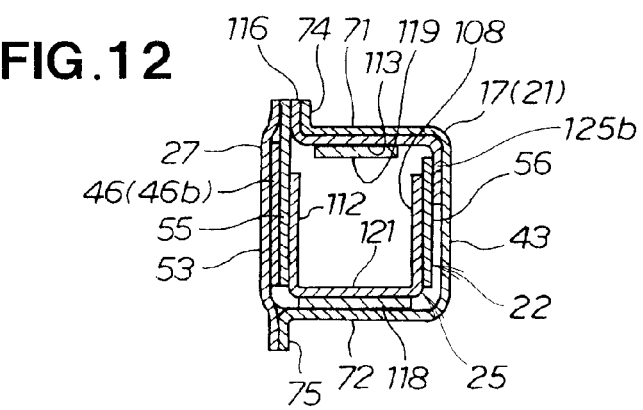
FIG. 12 is a cross-sectional view taken along line 12-12 of FIG. 5.
Figure 13:
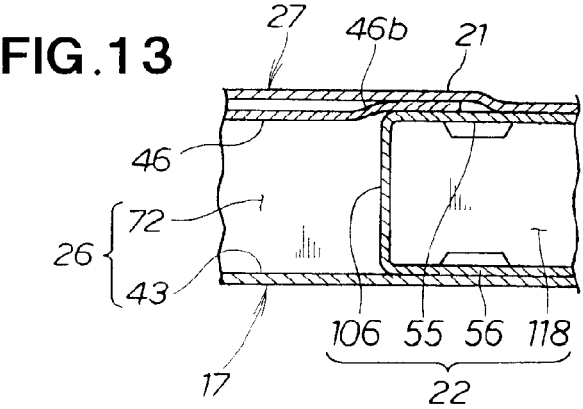
FIG. 13 is a cross-sectional view taken along line 13-13 of FIG. 5.

Furthermore, the wall 56 on the vehicle-widthwise inside wall of the adapter 22 is joined to the wall 43 on the vehicle-widthwise inside wall of the front side frame 17 as shown in FIGS. 8A, 8B, and 12. The vehicle-widthwise inside surface of the front side frame 17 has a shape which curves toward the vehicle-widthwise center as described above. The adapter 22 creates resistance against a bending moment created in the front side frame 17 in accordance with the collision force from the front, and the bending moment can be dispelled.

Furthermore, as shown in FIGS. 2, 11, 20, and 21, the stiffener 46 is formed into a substantially U-shaped cross section opening in the vehicle width direction, and the stiffener has both the top flange 102 positioned at the top end and the bottom flange 103 positioned at the bottom end. The top flange 102, which extends in the vehicle width direction, is joined to the top wall 71 of the front side frame 17. The bottom flange 103, which extends in the vehicle width direction, is joined to the bottom plate 72 of the front side frame 17. Therefore, a closed cross section 126 having a substantially rectangular cross section is formed by the front side frame 17. Furthermore, another closed cross section 127 is formed by the stiffener 46 and the front side frame 17. As a result, folding of the front side frame 17 can be prevented by the two closed cross sections 126 and 127.

Furthermore, the adapter 22 is composed of the body 124 and the reinforcing part 125 joined to the body 124, as shown in FIGS. 4, 8A, and 8B. The body 124 and the reinforcing part 125 are folded components made from steel plates or other plate members. The body 124 is composed of the substantially quadrangular bottom plate 106 which faces in the vehicle forward-backward direction, and the three side plates 55, 56, 118 positioned on three sides of the bottom plate 106. The reinforcing part 125 has a side plate 113 (the ceiling plate 113) positioned on the remaining side of the bottom plate 106. The ceiling plate 113 constitutes the top part of the adapter 22. In other words, the flange 115 of the remaining side plate 113 is joined to the cross member 23, holding the dashboard lower panel 19 from the sides.

Thus, the adapter 22 can be readily manufactured by pressing a plate member because the body 124 and the reinforcing part 125 are folded components composed of plate members. Moreover, the adapter 22 is configured from two members: the body 124 and the reinforcing part 125. Therefore, by estimating the extent of the load transmitted by the adapter 22 and increasing the strength of either the body 124 or the reinforcing part 125, it is possible to control the direction of load transmission and the extent of the transmitted load.

Furthermore, as shown in FIGS. 1 and 20, the lower part of the front side frame 17 comprises a sub frame mount stiffener 63 for attaching the sub frame 34. The sub frame mount stiffener 63 is a member provided to the lower surface of the rear part of the front side frame 17, and is composed of the mount 59 for attaching the sub frame 34, and the reinforcing part 65 provided to the front part of the mount 59 for reinforcing the front side frame 17. Thus, the front side frame 17 is reinforced by the sub frame mount stiffener 63. Therefore, it is possible to increase the support strength required for the sub frame 34 to be supported by the front side frame 17.

The front end of the reinforcing part 65 extends below the front end of the stiffener 46, as shown in FIG. 6. Therefore, the strength of the stiffener 46 in the forward-backward direction of the vehicle can be increased by the reinforcing part 65. As a result, it is possible to improve the transmission characteristics, whereby collision force from the front is transmitted rearward by the stiffener 46.

Furthermore, the front side frame 17 has a lower flange 75 which hangs down from the vehicle-widthwise outer end, as shown in FIG. 22. The mount 59 is a member having a substantially crank-shaped cross section (including a substantially Z-shaped cross section), composed of the bottom plate 59$c$ running along the bottom wall 72 of the front side frame 17, the inside flange 59$b$ which stands upright from the vehicle-widthwise inner end of the bottom plate 59$c$ and which is joined to the vehicle-widthwise inside wall 43 of the front side frame 17, and the outside flange 59$a$ which hangs down from the vehicle-widthwise outer end of the left-to-right bottom plate 59$c$ and which is joined to the lower flange 75 of the front side frame 17. Thus, since the mount 59 is firmly joined to the front side frame 17, the sub frame 34 is supported by the front side frame 17 with a large amount of support strength.

Moreover, as shown in FIG. 21, the reinforcing part 65 is a member having a substantially reverse L-shaped cross section, composed of the bottom plate 65$c$ joined to the bottom wall 72 of the front side frame 17, and the inside flange 65$b$ which stands upright from the vehicle-widthwise inner end of the bottom plate 65$c$ and which is joined to the vehicle-widthwise inside wall 43 of the front side frame 17. The periphery of the front side frame 17, which supports the sub frame 34, is also reinforced by the reinforcing part 65.

Therefore, the support strength whereby the front side frame 17 supports the sub frame 34 can be increased, and the front side frame 17 can be reinforced.

Furthermore, the sub frame mount stiffener 63 is provided so as to overlap the adapter 22, as shown in FIGS. 4 and 5. In other words, the front side frame 17, the adapter 22, and the rear end of the sub frame mount stiffener 63 are overlapped and joined together. Therefore, the support strength whereby the front side frame 17 supports the sub frame 34 can be further increased, and the front side frame 17 can be reinforced.

Furthermore, the front side frame 17 is provided with a holding bracket 62 for holding the collar nut 79, as shown in FIGS. 6 and 7. The collar nut 79 is a member for mounting the engine 32 (see FIG. 1), which is arranged to the inside of the front side frame 17. The front end 46$a$ of the stiffener 46 is positioned behind the holding bracket 62 and is provided to the front side frame 17. Therefore, the front side frame 17 can efficiently transfer collision force from the front to the rear part, without the region of the stiffener 46 being affected by the highly rigid engine.

The vehicle body 13 of the present invention is applicable in an automobile comprising an adapter 22 for bonding together the left and right front side frames 16, 17 and the left and right floor frames 24, 25.

Obviously, various minor changes and modifications of the present invention are possible in light of the above teaching. It is therefore to be understood that within the scope of the appended claims the invention may be practiced otherwise than as specifically described.

What is claimed is:

1. A front vehicle body comprising:
    left and right front side frames provided on left and right sides of a front part of a vehicle body and extending longitudinally of the vehicle body;
    a dashboard lower panel, disposed behind the left and right front side frames, for partitioning the vehicle body into front and rear parts; and
    left and right floor frames disposed behind the dashboard lower panel and extending longitudinally of the vehicle body,
    wherein each of the left and right front side frames comprises a hollow member of substantially quadrangular cross section,
    a cross member is provided on a rear end surface of the dashboard lower panel in such a manner as to extend transversely of the vehicle body,
    the dashboard lower panel has a lower part inclined rearwardly downwardly of the vehicle body,
    each of the left and right floor frames has a front end which extends forwardly upwardly of the vehicle body along the lower part of the dashboard lower panel and is joined via a respective one of left and a right adapters to a rear end of a respective one of the left and right front side frames,
    each of the left and right adapters is formed into a substantially box-shaped configuration so as to be joined to an end of a respective one of the left and right front side frames,
    each of the left and right adapters is joined to the cross member with the dashboard lower panel sandwiched therebetween,
    each of the left and right front side frames is comprised of a front-half portion and a rear-half portion continuing from a rear end of the front-half portion, the front-half portion being formed into a linear shape elongated longitudinally of the vehicle body, the rear-half portions being curved with vehicle-widthwise inside surfaces coming closer to each other toward a rear part thereof, and
    each of the left and right front side frames houses therein a stiffener extending linearly longitudinally of the vehicle body, the stiffener being joined at a front end to the rear end and a vehicle-widthwise inside wall of the front-half portion, and a rear end joined to a vehicle-widthwise outside wall of the respective adapter.

2. The front vehicle body structure of claim 1, wherein the stiffener is formed into a substantially U-shaped cross section opening in a vehicle width direction and has a top flange positioned at a top end and a bottom flange positioned at a bottom end, the top flange extending in the vehicle width direction and being joined to a top wall of the respective front side frame, the bottom flange extending in the vehicle width direction and being joined to a bottom wall of the respective front side frame.

3. The front vehicle body structure of claim 1, further comprising left and right sub frame mount stiffeners for attaching a sub frame to lower parts of the left and right front side frames, wherein each of the left and right sub frame mount stiffeners is provided to a lower surface of a rear part of the respective front side frame and is comprised of a mount for attaching the sub frame and a reinforcing part, provided to a front part of the mount, for reinforcing the respective side frame, a front end of the reinforcing part extending up to below the front end of the stiffener housed in the respective front side frame.

4. The front vehicle body structure of claim 3, wherein each of the left and right front side frames has a lower flange hanging down from a vehicle-widthwise outer end thereof, the mount has a substantially crank-shaped cross-sectioned and is comprised of a bottom plate running along a bottom wall of the respective front side frame, an inside flange rising from a vehicle-widthwise inner end of the bottom plate and joined to the vehicle-widthwise inside wall of the respective front side frame, and an outside flange hanging down from a vehicle-widthwise outer end of the bottom plate and joined to the lower flange of the respective front side frame, and the reinforcing part has a substantially reverse L-shaped cross section and is comprised of a bottom plate joined to the bottom wall of the respective front side frame and an inside flange rising from a vehicle-widthwise inner end of the bottom plate and joined to the vehicle-widthwise inside wall of the respective front side frame.

5. The front vehicle body structure of claim 3, wherein the sub frame mount stiffener is provided to lie on the respective adapter.

6. The front vehicle body structure of claim 1, wherein each of the front side frames is comprised of a frame inner member positioned on a vehicle-widthwise inner side thereof and a frame outer member positioned on a vehicle-widthwise outer side thereof, the frame inner member has a substantially U-shaped cross section opening in the vehicle-widthwise outer side, the vehicle-widthwise-outer side open end of the frame inner member being closed off by the frame outer member, the front side frame is provided with a holding bracket for holding a collar nut for mounting an engine to be disposed between the left and right front side frames, and the front end of the stiffener is provided behind the holding bracket.

7. The front vehicle body structure of claim 6, wherein each of the left and right frame inner members has on a vehicle-widthwise surface a first bead, each of the left and right frame outer members has on a vehicle-widthwise surface a second bead, each of the left and right stiffeners has on a vehicle-widthwise surface a third bead, and the first bead, the second bead, and the third bead are positioned on the rear-half portion of the respective front side frame, are oriented toward the front end of the respective floor frame, and are superposed over each other in the vehicle width direction.

8. The front vehicle body structure of claim 6, wherein each of the left and right stiffeners has strength greater than the respective front side frame.

9. A front vehicle body structure comprising:

left and right front side frames provided on left and right sides of a front part of a vehicle body and extending longitudinally of the vehicle body;

a dashboard lower panel, disposed behind the left and right front side frames, for partitioning the vehicle body into front and rear parts; and left and right floor frames disposed behind the dashboard lower panel and extending longitudinally of the vehicle body, wherein each of the left and right front side frames comprises a hollow member of substantially quadrangular cross section, a cross member is provided on a rear end surface of the dashboard lower panel in such a manner as to extend transversely of the vehicle body, the dashboard lower panel has a lower part inclined rearwardly downwardly of the vehicle body, each of the left and right floor frames has a front end which extends forwardly upwardly of the vehicle body along the lower part of the dashboard lower panel and is joined via a respective one of left and a right adapters to a rear end of a respective one of the left and right front side frames, each of the left and right adapters is formed into a substantially box-shaped configuration so as to be joined to an end of a respective one of the left and right front side frames, each of the left and right adapters is joined to the cross member with the dashboard lower panel sandwiched therebetween, each of the left and right adapters is comprised of a body and a reinforcing part joined to the body, the body is formed by folding a single plate material and comprised of a substantially quadrangular bottom plate faced longitudinally of the vehicle body and three side plates positioned on three sides of the bottom plate, the reinforcing part has a side plate positioned on a remaining side of the bottom plate, and the side plate of the reinforcing part constitutes a top part of the respective adapter and is joined to the cross member in such a manner as to sandwich the dashboard lower panel.

* * * * *